US012694151B2

(12) United States Patent
Carpenter et al.

(10) Patent No.: US 12,694,151 B2
(45) Date of Patent: Jul. 28, 2026

(54) METHODS AND APPARATUS TO PROVIDE REGISTER INFORMATION OF SEMICONDUCTOR CHIPS

(71) Applicant: Texas Instruments Incorporated, Dallas, TX (US)

(72) Inventors: J. Paul Austin Carpenter, Arlington, TX (US); Kenyan Degles Burnham, Forney, TX (US); Brady Charles Ramsey, Dallas, TX (US); Paul Ian Strathdee Marshall, Lucas, TX (US); Daniel Lusk, Cayuga, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 58 days.

(21) Appl. No.: 18/625,995

(22) Filed: Apr. 3, 2024

(65) Prior Publication Data

US 2025/0165568 A1 May 22, 2025

Related U.S. Application Data

(60) Provisional application No. 63/601,674, filed on Nov. 21, 2023.

(51) Int. Cl.
*G06F 21/62* (2013.01)
*G06F 21/79* (2013.01)

(52) U.S. Cl.
CPC .......... *G06F 21/6245* (2013.01); *G06F 21/79* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 9,460,407 B2 * | 10/2016 | Fang | .................. | G06Q 30/0201 |
| 11,232,219 B1 * | 1/2022 | Ochotta | ................ | G06F 21/121 |
| 11,341,257 B1 * | 5/2022 | Cohen | .................... | G06F 16/256 |
| 2013/0346928 A1 * | 12/2013 | Li | ........................... | G06F 30/30 |
| | | | | 716/103 |
| 2018/0011959 A1 * | 1/2018 | Irissou | .................... | G06F 30/39 |

(Continued)

OTHER PUBLICATIONS

"RapidIO IP Core User Guide", UG-20078, May 8, 2017, Last updated for Intel® Quartus® Prime Design Suite: 17.0, 195 pages. (Year: 2017).*

*Primary Examiner* — Michael Pyzocha
(74) *Attorney, Agent, or Firm* — Michelle F. Murray; Frank D. Cimino

(57) ABSTRACT

An example apparatus includes: accessing, by storage interface circuitry, chip information, the chip information corresponding to a semiconductor chip; removing, by at least one processor circuit, redundant information from the chip information to generate deduplicated chip information; classifying, by the at least one processor circuit, the deduplicated chip information into first classified chip information and second classified chip information, the first classified chip information corresponding to a first access permission, the second classified chip information corresponding to a second access permission; and causing, by the at least one processor circuit, storing (block 808) of the first classified chip information in a first classified file in memory and the second classified chip information in a second classified file in the memory.

21 Claims, 13 Drawing Sheets

(56)  References Cited

U.S. PATENT DOCUMENTS

| | | | | |
|---|---|---|---|---|
| 2021/0012016 A1* | 1/2021 | Tehranipoor | ............ | G06F 30/30 |
| 2021/0133338 A1* | 5/2021 | Chopra | ............... | G06F 11/1458 |
| 2023/0222037 A1* | 7/2023 | Natanzon | .............. | G06F 3/0652 |
| | | | | 711/162 |
| 2023/0239166 A1* | 7/2023 | Cheng | ....................... | H04L 9/50 |
| | | | | 713/165 |
| 2025/0053998 A1* | 2/2025 | Gossett | ................ | G06F 21/602 |
| 2025/0156585 A1* | 5/2025 | Ochotta | .................... | H04L 9/14 |
| 2025/0328519 A1* | 10/2025 | Koploy | .............. | G06F 16/2365 |

* cited by examiner

500

```
{
        "register_full_name": "ADC_ecc_aggr_stat",
        "classification": "",
        "ldesc": "Misc Status",
        "sdesc": "Misc Status",
        "offset": 12,
        "length": 1,
        "stride": 4,
        "reset_value": 2,
        "reset_mask": null,
        "size": 32,
        "rst": "",
        "register_spec_region_info": [
                {
                        "inst_name": "ADCJERRY0",
                        "region_final_name": "ADC_ecc_aggr",
                        "base_hex": "0071 A00Ch"
                }
        ],
        "bit_table_width": 16,
        "offset_hex": "ch",
        "bitfields": [
                {
                        "start": 31,
                        "stop": 11,
                        "name": "RESERVED",
                        "access_type": "None",
                        "reset_value": 1,
                        "reset_mask": null,
                        "bit_range": "31:11",
                        "sdesc": "Reserved",
                        "ldesc": "Reserved",
                        "reset_value_b": "1",
                        "reset_value_h": "1"
                },
                {

"name": "num_rams",
                        "access_type": "R",
                        "reset_value": 2,
                        "sdesc": "",
                        "ldesc": "Indicates the number of RAMS
serviced by the ECC aggregator",
                        "reset_mask": 2047,
                        "start": 10,
                        "bit_range": "10:0",
                        "stop": 0,
                        "reset_value_b": "10",
                        "reset_value_h": "2"
                }
        ],
        "default_address_string": {
                "inst_name": "ADCJERRY0",
                "region_final_name": "ADC_ecc_aggr",
                "base_hex": "0071 A00Ch"
        }
},
```

104 — AUGMENTATION STORAGE (JSON) INTERFACE

126 — AUGMENTED CHIP INFORMATION FILE

604 — PARSED REGISTERS

127 — SIMPLIFIED CHIP INFORMATION FILE(S)

LEGACY FILE TYPE (PARSED REGISTERS)

608

128 — CLASSIFIED FILE(S)

120 — WEB APP

METHODS AND APPARATUS TO PROVIDE REGISTER INFORMATION OF SEMICONDUCTOR CHIPS

CROSS-REFERENCE TO RELATED APPLICATION

This patent application claims the benefit of and priority to U.S. Provisional Patent Application No. 63/601,674 filed Nov. 21, 2023, which Application is hereby incorporated herein by reference in its entirety.

TECHNICAL FIELD

This description relates generally to semiconductor chip design and, more particularly, to methods and apparatus to provide register information for semiconductor chips.

BACKGROUND

Designing semiconductor chips involves generating design documents and specification documentation. Such documentation includes information about registers of the chip that are accessible by system design customers to configure different aspects and functionalities of these semiconductor chips. In this manner, system design customers can incorporate semiconductor chips into their designs and set register values in the semiconductor chips to configure or customize how such chips will operate as part of an overall system.

SUMMARY

For methods and apparatus to provide register information for semiconductor chips, an example method includes accessing, by a storage interface, chip information, the chip information corresponding to a semiconductor chip. The method includes accessing, by storage interface circuitry, chip information, the chip information corresponding to a semiconductor chip. The method includes removing, by at least one processor circuit, redundant information from the chip information to generate deduplicated chip information. The method includes classifying, by the at least one processor circuit, the deduplicated chip information into first classified chip information and second classified chip information, the first classified chip information corresponding to a first access permission, the second classified chip information corresponding to a second access permission. The method includes causing, by the at least one processor circuit, storing of the first classified chip information in a first classified file in memory and the second classified chip information in a second classified file in the memory. Other examples are described.

For methods and apparatus to provide register information for semiconductor chips, an example apparatus includes memory. The apparatus includes memory. The apparatus includes machine-readable instructions in the memory. The apparatus includes at least one processor circuit to be programmed by the machine-readable instructions to: apply a first filter to information in a file based on a first user selection of one of first names in a first graphical user interface (GUI) selection control of a GUI; apply a second filter to the information in the file based on a second user selection of one of second names in a second GUI selection control of the GUI; and provide register information to display in an information view section of the GUI based on a third user selection of one of third names in a third GUI selection control of the GUI. Other examples are described.

For methods and apparatus to provide register information for semiconductor chips, an example apparatus includes memory. The apparatus includes memory. The apparatus includes machine-readable instructions in the memory. The apparatus includes a display. The apparatus includes at least one processor circuit coupled to the memory and to the display, the at least one processor circuit to be programmed by the machine-readable instructions to: instruct the display to show first names in a first graphical user interface (GUI) selection control of a GUI; based on a first user selection of one of the first names, apply a first filter to information in a file; based on the first filter, instruct the display to show second names in a second GUI selection control of the GUI; based on a second user selection of one of the second names, apply a second filter to the information in the file; based on the second filter, instruct the display to show third names in a third GUI selection control of the GUI; and based on a third user selection of one of the third names, instruct the display to show register information in an information view section of the GUI. Other examples are described.

BRIEF DESCRIPTION OF THE DRAWINGS

FIG. 5 is a code listing of an example register definition to represent chip information corresponding to a register.

The drawings are not necessarily to scale. Generally, the same reference numbers in the drawing(s) and this description refer to the same or similar (functionally and/or structurally) features and/or parts.

DETAILED DESCRIPTION

Figure 1:
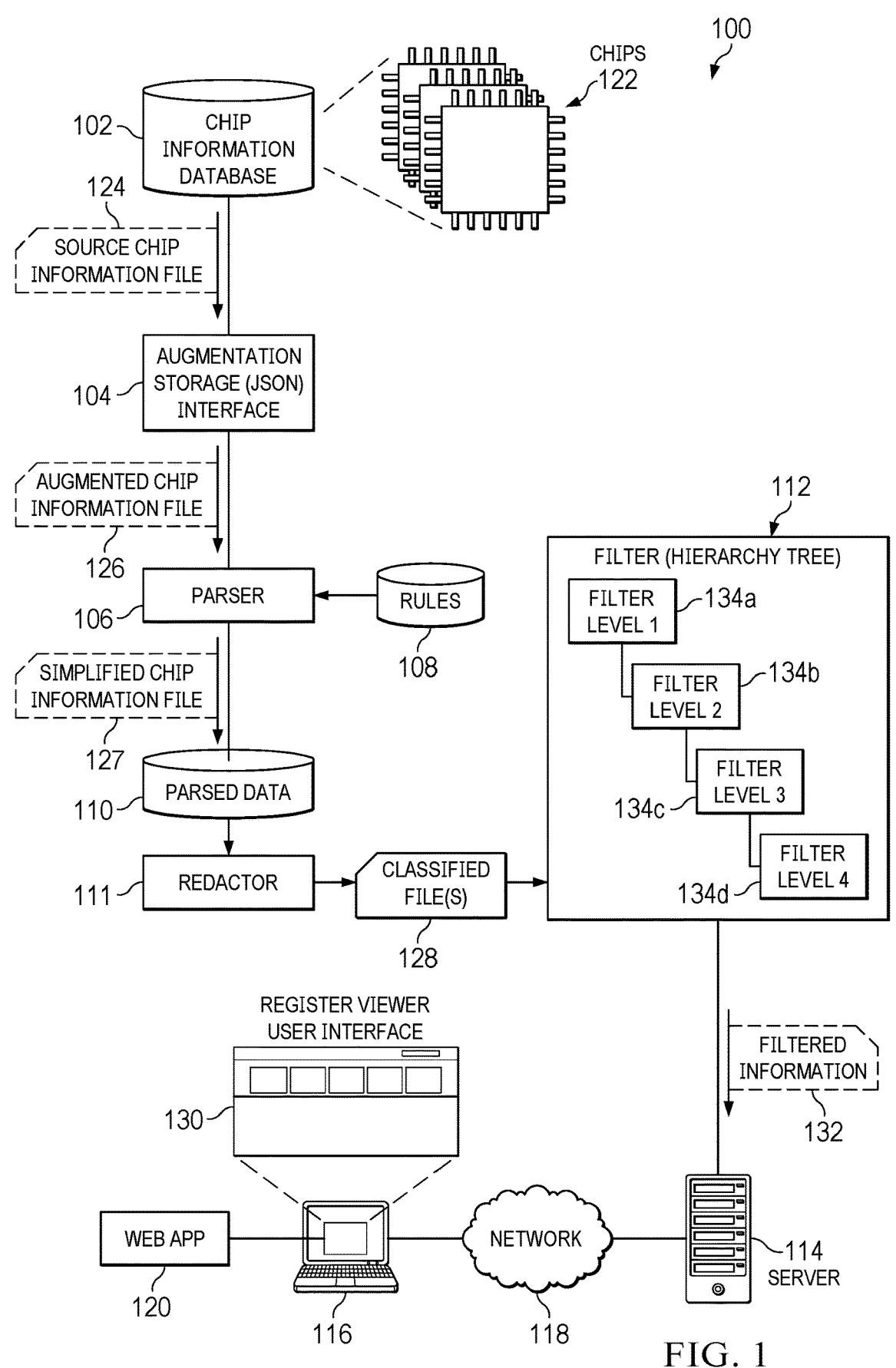
FIG. 1 is a block diagram of an example computer-based network environment in which register information of a semiconductor chip is provided to an end-user in an online mode.

A semiconductor chip can include millions of transistors and other electrical circuit components that are arranged and coupled to implement different circuits and/or functionalities. As such, a semiconductor chip may be provided with multiple registers to configure the different circuits and/or functionality. As used herein, a register is a durable array of bit locations in a semiconductor chip to store information available to a circuit of the semiconductor chip during operation of that circuit. For example, a processor core in a semiconductor chip may be designed to include a plurality of registers available to the processor core during operation to store immediately available information such as operands, memory addresses, configuration information, etc. As semiconductor chips grow in circuitry and processing capabilities, the number of registers implemented to configure such capabilities grows significantly. System designers that incorporate such semiconductor chips into electronic designs use data sheets or technical reference manuals (TRMs) to access register information to identify locations of those registers in a chip and to understand how different registers can be used to configure a chip. Semiconductor chip design companies can create data sheets or TRMs for every semiconductor chip device they design to provide in-depth descriptions of features, performance, and pins for the device. A TRM describes peripherals in a device and how to use features of the device. From time to time, chip design companies release errata to describe differences on expected versus actual behavior of a device, known advisories, and workarounds. Managing accessibility and viewability of chip information in data sheets, TRMs, or errata can be cumbersome when the number of registers on a semiconductor chip becomes significantly large. For example, register tables of register information can make up to 60-85% of a TRM.

Examples described herein use a data formatting structure that allows assigning access privileges to different chip information and facilitates filtering chip information based on various privilege levels of end-users. Such privileges can be customer-level privileges or user-level privileges. Privilege-based access may be used to protect some chip information from being accessed by non-authorized customers or users while allowing such customers or users to access other chip information that they are authorized to access. For example, some chip information may be accessible to internal users of a chip design company that is designing the semiconductor chip. However, a customer of the chip design company may have permissions to access only a subset of the chip information and another customer may have permissions to access only another subset of the chip information. A customer's permission or privilege level may correspond to that customer's manner of using the chip, technical contributions to features of the chip, monetary payment for use of certain aspects of the chip, non-disclosure agreement (NDA), etc.

To access chip information, examples described herein provide an application program having a user interface for users to perform parametric searches or filtering of the chip information using a more automated approach than manually searching through a multi-page TRM document. In this manner, examples described herein reduce search time for design engineers and employees referring to register information in technical documents. In addition, examples described herein provide time savings for technical document publication groups in chip design companies by allowing them to publish chip information in one to three hours instead of 48-72 hours (or more) that it takes to publish a datasheet or TRM using prior techniques.

The application program may be a web framework implemented as a web app (e.g., an HTML-based web app) for use in a web-connected device or in an air-gapped environment in which a device is freestanding and not network-connected. The web app can be used internally in a chip design company that is designing the semiconductor chip. The web app is also configurable for use outside the chip design company by customers of the chip design company. For example, on a per-customer basis, the web app accesses and displays only the subset of chip information that is authorized for access by that customer. In addition, a customer can customize a user interface of the web app for brand-aware recognition by its users. For example, the web app may be configured to display a company name of the customer as a title banner or landing page of the web app. In this manner, a user of the customer can expect to see chip information of a semiconductor chip that is relevant to a design of that customer. The application program can be used to improve the operation of a chip by facilitating how quickly chip information is accessed and viewed so that design changes in chips can be made faster and identified faster based on the chip information. In addition, the application program improves the design process of systems incorporating chips by making chip information of such chips more easily accessible as described below.

In examples described herein, the web framework displays register information of semiconductor chips using parametric searching to dynamically access chip information from a chip information source file and return the chip information to a user application for presentation via a display. The parametric searching capabilities can be used to return partial match results so that users need not know the exact and full name of a register to find the register. For example, a user may provide a partial name of an intellectual property (IP) core of a chip, a partial name of a register of the chip, or a partial register address of the chip. Using a partial search string or keyword, the user interface can output partial matching chip information that is authorized for access by that user based on the user's privilege level. This allows a user to make decisions about what register information to view based on functionality of a chip in which the user is interested. In examples described herein, an embedded search capability is implemented by parsing chip information of a substantially large number of registers (e.g., tens of thousands of registers) into a more manageable list that improves a user experience when using a user application to access the chip information.

In addition to providing parametric search capabilities, examples described herein also provide a user interface that includes filtering controls for users to navigate chip information organized using the data formatting structure described herein. In such user interface, a user can relatively quickly filter through multitudes of chip information such as register names to access register information of chips without needing knowledge of the specific memory addresses of registers or full register names. Instead, the user interface can display hierarchical categories of chip subsystems based on privilege levels noted in the data formatting structure. This allows users to navigate and search the hierarchical categories from subsystem level views to register level views of a chip to access chip information according to their access privilege. A user knowing a particular subsystem of interest can drill down into that subsystem via the user interface to reveal names of registers implemented in that subsystem without needing to know the full names of the registers in advance and without the risk of the user accessing non-authorized chip information. The desired chip information can be retrieved for user access within milliseconds delivery time, even when the information is accessed from a server.

After drilling down in a particular chip subsystem using the user interface, the user can select a listed register to access register information such as field and bit descriptions corresponding to that register. The user can then use this register information to develop firmware or software to configure the register of interest (e.g., write instructions in firmware to set different values in the register bits or fields to cause the chip to perform one or more operations or to cause the chip to be configured in any suitable manner).

Although examples are described herein for use in organizing and providing access to chip information of semiconductor chips, examples described herein may alternatively be used for any other type of data. Examples of other types of data that may be organized and accessed using techniques described herein include vehicle data, medical data, hospitality services data, supply chain data, manufacturing data, delivery services data, etc.

FIG. 1 is a block diagram of an example computer-based network environment 100 in which chip information of one or more semiconductor chips is/are provided to an end-user in an online mode. The computer-based network environment 100 includes an example chip information database 102, an example augmentation storage interface 104, an example parser 106, an example rules store 108, an example parsed data store 110, an example redactor 111, an example filter 112, and an example server 114. In the illustrated example, the server 114 is in communication with a client device 116 via a network 118. In the example in FIG. 1, the client device 116 executes a web app 120 to access chip information. The computer-based network environment 100 may be located in an enterprise network or a cloud service owned, leased, and/or operated by a chip design company. The computer-based network environment 100 provides access to chip information by authorized users that may be customers of the chip design company.

The chip information database 102 is provided to store chip information about one or more semiconductor chips 122. The chip information database 102 may be implemented by magnetic storage devices (e.g., hard disk drives (HDDs)), solid state storage devices (e.g., flash memory, solid state drives (SSDs), etc.), optical storage devices (e.g., digital versatile discs (DVDs), compact discs (CDs), etc.), network-connected storage devices, local storage devices, peripheral storage devices, etc. In some examples, the chip information may be stored in a Verilog-Perl format. Example chip information includes register information corresponding to a plurality of registers of a semiconductor chip. (However, as noted above, examples disclosed herein may be used to organize and access other types of data including vehicle data, medical data, hospitality services data, supply chain data, manufacturing data, delivery services data, etc.) Example register information includes bitfield names, bit names, bitfield descriptions, bit descriptions, parameter descriptions, etc. of corresponding registers. Example bitfield descriptions, bit descriptions, parameter descriptions may be descriptions of configurations, functionalities, modes, etc. provided by different bitfield values or individual bits. Example chip information can also include embedded controller information, processing core information, cache information, embedded memory information, operating specifications, design bug reports, chip errata, and/or any other information pertaining to use, functionality, or programmability of a chip. That is, any information about a semiconductor chip that may be of interest to a chip designer in designing the chip or may be of interest to a system designer in incorporating the chip into a larger system design may be included in the chip information.

The augmentation storage interface 104 is provided to access chip information in the chip information database 102 and to format the chip information to facilitate readability by the parser 106. For example, the augmentation storage interface 104 obtains a source chip information file 124 from the chip information database 102, analyzes the data and structure of the data in the source chip information file 124, and applies fixes and re-formatting to the data in the source chip information file 124 to generate an augmented chip information file 126 (e.g., a modified version of the source chip information file 124). In some examples, the augmentation storage interface 104 addresses bug fixes and corrects typographical errors to the data in the source chip information file 124. In some examples, chip information is stored in the chip information database using a JavaScript Object Notation (JSON) format, which is a format to store and transport data as attribute-value pairs. For example, an attribute-value pair of "reset_value": 01100011 specifies the value of "01100011" for an attribute of "reset_value". In such example, the value of "01100011" is an 8-bit binary value that corresponds to bit values an 8-bit register following a reset event. The attribute-value pair formatting of JSON makes the JSON format a user-readable and machine-readable format. In some examples, the augmentation storage interface 104 is implemented as a JSON interface to access, read, and create register information for a single global publication network (GPN) stored in a JSON-formatted datasheet accessible via a web app user interface (e.g., the GUI 130 of the web app 120). An example JSON representation of a register description is as follows:

```
{
    "$schema": "http://json-schema.org/draft-04/schema#",
    "type": "object",
    "properties": {
        "ip_instances": {
            "type": "array",
            "items": [
```

```
{
    "type": "object",
    "properties": {
        "ip_name": {
            "type": "string"
        },
        "inst_name": {
            "type": "string"
        },
        "regions": {
            "type": "array",
            "items": [
                {
                    "type": "object",
                    "properties": {
                        "regions_info": {
                            "type": "array",
                            "items": [
                                {
                                    "type": "object",
                                    "properties": {
                                        "inst_name": {
                                            "type": "string"
                                        },
                                        "base": {
                                            "type": "string"
                                        },
                                        "region_final_name": {
                                            "type": "string"
                                        },
                                        "base_hex": {
                                            "type": "string"
                                        }
                                    },
                                    "required": [
                                        "inst_name",
                                        "base",
                                        "region_final_name",
                                        "base_hex"
                                    ]
                                }
                            ]
                        },
                        "length": {
                            "type": "integer"
                        },
                        "sdesc": {
                            "type": "string"
                        },
                        "ldesc": {
                            "type": "null"
                        },
                        "registers": {
                            "type": "array",
                            "items": [
                                {
                                    "type": "object",
                                    "properties": {
                                        "register_full_name": {
                                            "type": "string"
                                        },
                                        "classification": {
                                            "type": "string"
                                        },
                                        "ldesc": {
                                            "type": "string"
                                        },
                                        "sdesc": {
                                            "type": "string"
                                        },
                                        "offset": {
                                            "type": "integer"
                                        },
                                        "length": {
                                            "type": "integer"
                                        },
                                        "stride": {
                                            "type": "integer"
                                        },
```

```
                                        "reset_value": {
                                            "type": "integer"
                                        },
                                        "reset_mask": {
                                            "type": "null"
                                        },
                                        "size": {
                                            "type": "integer"
                                        },
                                        "rst": {
                                            "type": "string"
                                        },
                                        "register_spec_region_info": {
                                            "type": "array",
                                            "items": [
                                                {
                                                    "type": "object",
                                                    "properties": {
                                                        "inst_name": {
                                                            "type": "string"
                                                        },
                                                        "region_final_name": {
                                                            "type": "string"
                                                        },
                                                        "base_hex": {
                                                            "type": "string"
                                                        }
                                                    },
                                                    "required": [
                                                        "inst_name",
                                                        "region_final_name",
                                                        "base_hex"
                                                    ]
                                                }
                                            ]
                                        },
                                        "bit_table_width": {
                                            "type": "integer"
                                        },
                                        "offset_hex": {
                                            "type": "string"
                                        },
                                        "bitfields": {
                                            "type": "array",
                                            "items": [
                                                {
                                                    "type": "object",
                                                    "properties": {
                                                        "name": {
                                                            "type": "string"
                                                        },
                                                        "access_type": {
                                                            "type": "string"
                                                        },
                                                        "reset_value": {
                                                            "type": "integer"
                                                        },
                                                        "sdesc": {
                                                            "type": "string"
                                                        },
                                                        "ldesc": {
                                                            "type": "string"
                                                        },
                                                        "reset_mask": {
                                                            "type": "integer"
                                                        },
                                                        "start": {
                                                            "type": "integer"
                                                        },
                                                        "bit_range": {
                                                            "type": "string"
                                                        },
                                                        "stop": {
                                                            "type": "integer"
                                                        },
                                                        "reset_value_b": {
                                                            "type": "string"
                                                        },
```

-continued

-continued

```
            "reset_value_h": {
                "type": "string"
            }
        },
        "required": [
            "name",
            "access_type",
            "reset_value",
            "sdesc",
            "ldesc",
            "reset_mask",
            "start",
            "bit_range",
            "stop",
            "reset_value_b",
            "reset_value_h"
            ]
        }
        ]
    },
    "default_address_string": {
        "type": "object",
        "properties": {
            "inst_name": {
                "type": "string"
            },
            "region_final_name": {
                "type": "string"
            },
            "base_hex": {
                "type": "string"
            }
        }
        "required": [
            "inst_name",
            "region_final_name",
            "base_hex"
            ]
        }
    },
    "required": [
        "register_full_name",
        "classification"
        "ldesc",
        "sdesc",
        "offset",
        "length",
        "stride",
        "reset_value",
        "reset_mask",
        "size",
        "rst",
        "register_spec_region_info",
        "bit_table_width",
        "offset_hex",
        "bitfields",
        "default_address_string"
        ]
    }
    }
    ]
    }
},
"required": [
    "regions_info",
    "length",
    "sdesc".
    "ldesc",
    "registers"
    ]
    }
    ]
    }
},
```

```
        "required": [
            "ip_name",
            "inst_name",
            "regions"
            ]
        }
        ]
    },
    "instance_list": {
        "type": "array",
        "items": [
            {
                "type": "string"
            }
        ]
    },
    "unique_ip_list": {
        "type": "array",
        "items": [
            {
                "type": "string"
            }
        ]
    },
    "name": {
        "type": "string"
    }
    },
    "required": [
        "ip_instances",
        "instance_list",
        "unique_ip_list",
        "name"
        ]
}
```

Although the above JSON data structure is for a register description of a semiconductor chip, the same format may be used to adapt examples described herein to organize other types of data for user access via the web app 120 as described herein. Examples of other types of data format-table like the JSON data structure above include vehicle data, medical data, hospitality services data, supply chain data, manufacturing data, delivery services data, etc. For example, information about customer vehicles may be formatted as follows:

```
{
    "make": "Honda",
    "model": "Odyssey",
    "year": 2008,
    "owner": "Kenyan",
    "tire-pressure": [35, 35, 32, 35]
}
```

In the above example, the attribute-value pairs correspond to vehicle data such as a "Honda" value for a "make" attribute (e.g., "make": "Honda"). In a medical data example, an attribute-value pair of "patient_name": "Bob" corresponds to "Bob" as a value for the "patient_name" attribute. In a delivery services data example, an attribute-value pair of "city_name": "Chicago" corresponds to "Chicago" as a value for the "city_name" attribute. Many other attribute-value pairs are possible to adapt techniques described herein for uses other than organizing and accessing chip information.

Figure 7:
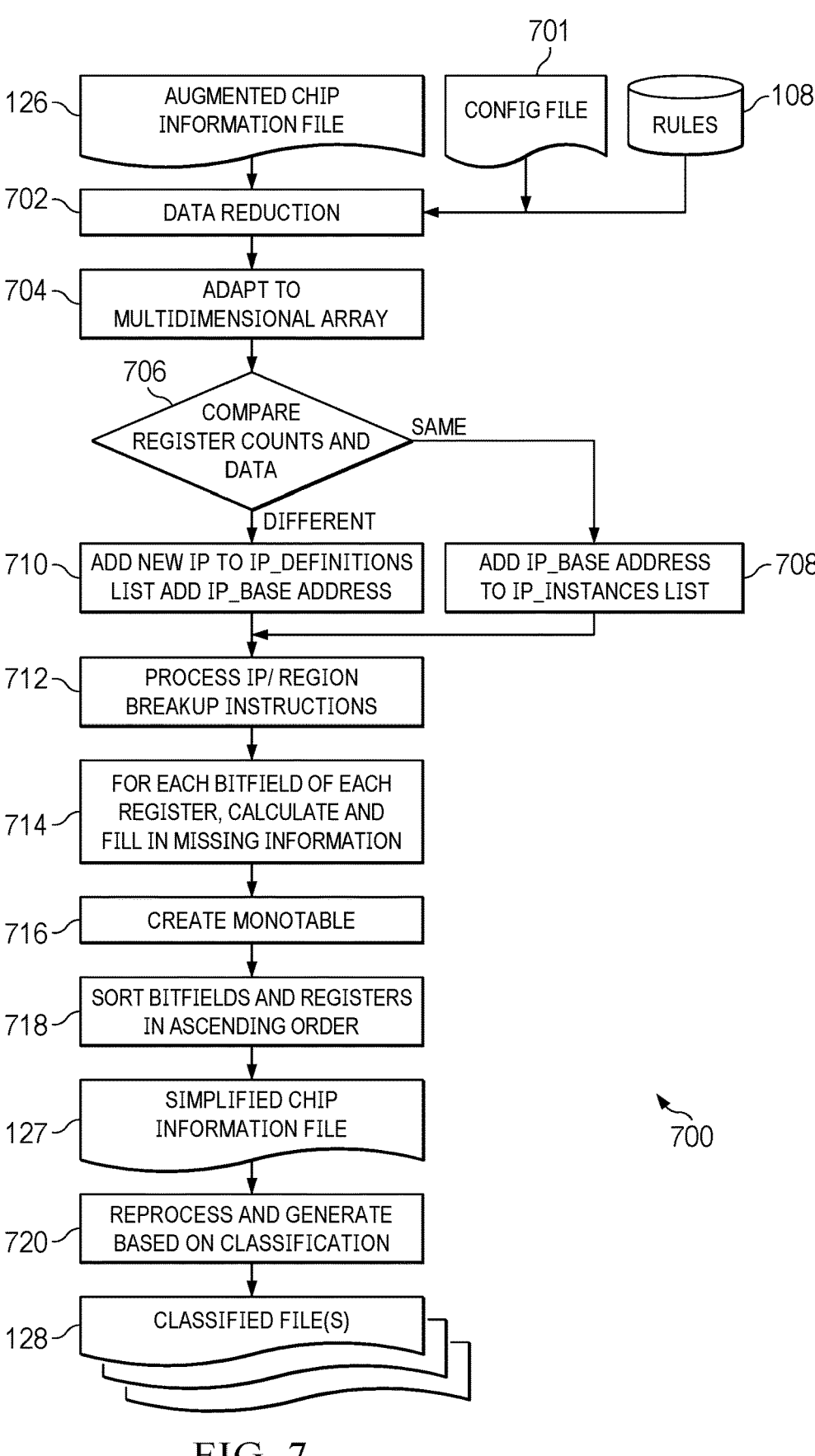
FIG. 7 is a flowchart representative of example machine-readable instructions and/or example operations that may be executed, instantiated, and/or performed using an example programmable circuitry implementation of the example parser and the example redactor of one or more of FIGS. 1, 2, and 4 to generate classified files for use as filterable and searchable technical reference manuals (TRMs).
Figure 8:
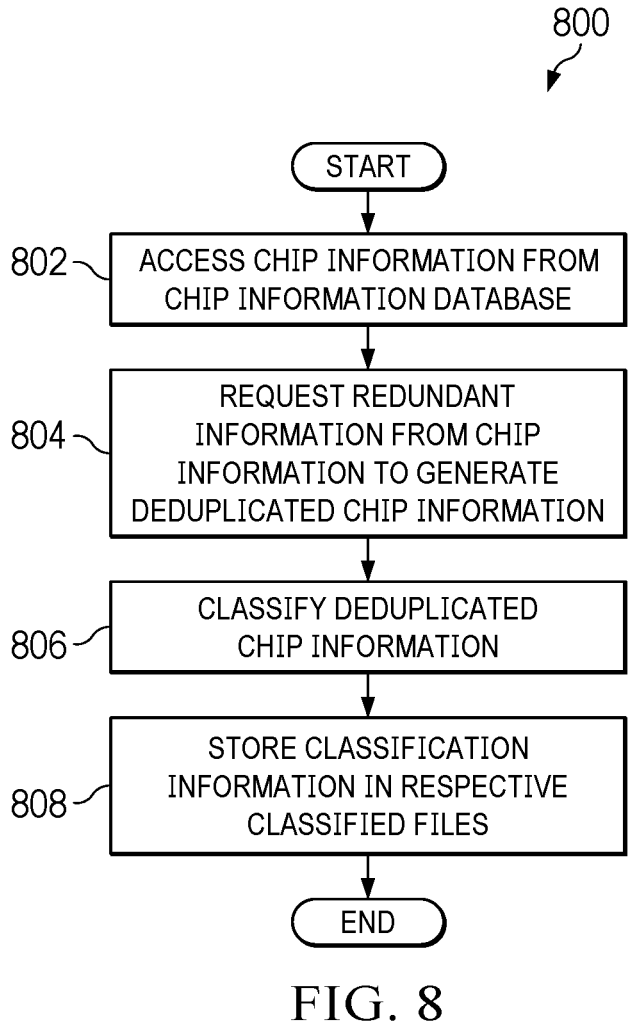
FIG. 8 is another flowchart representative of example machine-readable instructions and/or example operations that may be executed, instantiated, and/or performed using an example programmable circuitry implementation of the example parser and the example redactor of one or more of FIGS. 1, 2, and 4 to generate classified files for use as filterable and searchable TRMs.

In some examples, the augmentation storage interface 104 (e.g., augmentation storage interface circuitry) is instantiated by programmable circuitry executing augmentation storage interface instructions to perform operations such as those represented by the flowcharts of FIGS. 7 and 8.

In some examples, the computer-based network environment 100 includes means for accessing chip information in the chip information database 102. For example, the means for accessing chip information may be implemented by the augmentation storage interface 104. In some examples, the augmentation storage interface 104 may be instantiated by programmable circuitry such as the example programmable circuitry 1012 of FIG. 10. For instance, the augmentation storage interface 104 may be instantiated by the example microprocessor 1100 of FIG. 11 executing machine executable instructions such as those implemented by at least block 802 of FIG. 8. In some examples, the augmentation storage interface 104 may be instantiated by hardware logic circuitry, which may be implemented by an ASIC, XPU, or the FPGA circuitry 1200 of FIG. 12 that are structured to perform operations corresponding to the machine-readable instructions. Also or alternatively, the augmentation storage interface 104 may be instantiated by any other combination of hardware, software, or firmware. For example, the augmentation storage interface 104 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

The source chip information file 124 is referred to as a "golden file" because it is an original reproduction of chip information from the chip information database 102. The augmentation storage interface 104 adapts the data and structure of the data in the source chip information file 124 to generate the augmented chip information file 126 in a pre-parse format as described below in connection with FIG. 4. In examples described herein, chip information in the source chip information file 124 and the augmented chip information file 126 is formatted according to a JSON format. However, any other suitable data format may be used.

The parser 106 is provided to parse chip information in the augmented chip information file 126 to generate a simplified chip information file 127 as described below in connection with FIG. 4. The parsed data store 110 stores the simplified chip information file 127. The simplified chip information file 127 may be implemented in a JSON format or any other suitable data format. For example, the simplified chip information file 127 can be implemented as a customer JSON file for use in providing customer-accessible chip information.

In some examples, the parser 106 (e.g., parser circuitry) is instantiated by programmable circuitry executing augmentation storage interface instructions to perform operations such as those represented by the flowcharts of FIGS. 7 and 8.

In some examples, the computer-based network environment 100 includes means for parsing chip information. For example, the means for parsing chip information may be implemented by the parser 106. In some examples, the parser 106 may be instantiated by programmable circuitry such as the example programmable circuitry 1012 of FIG. 10. For instance, the parser 106 may be instantiated by the example microprocessor 1100 of FIG. 11 executing machine executable instructions such as those implemented by at least block 804 of FIG. 8. In some examples, the parser 106 may be instantiated by hardware logic circuitry, which may be implemented by an ASIC, XPU, or the FPGA circuitry

Figure 12:
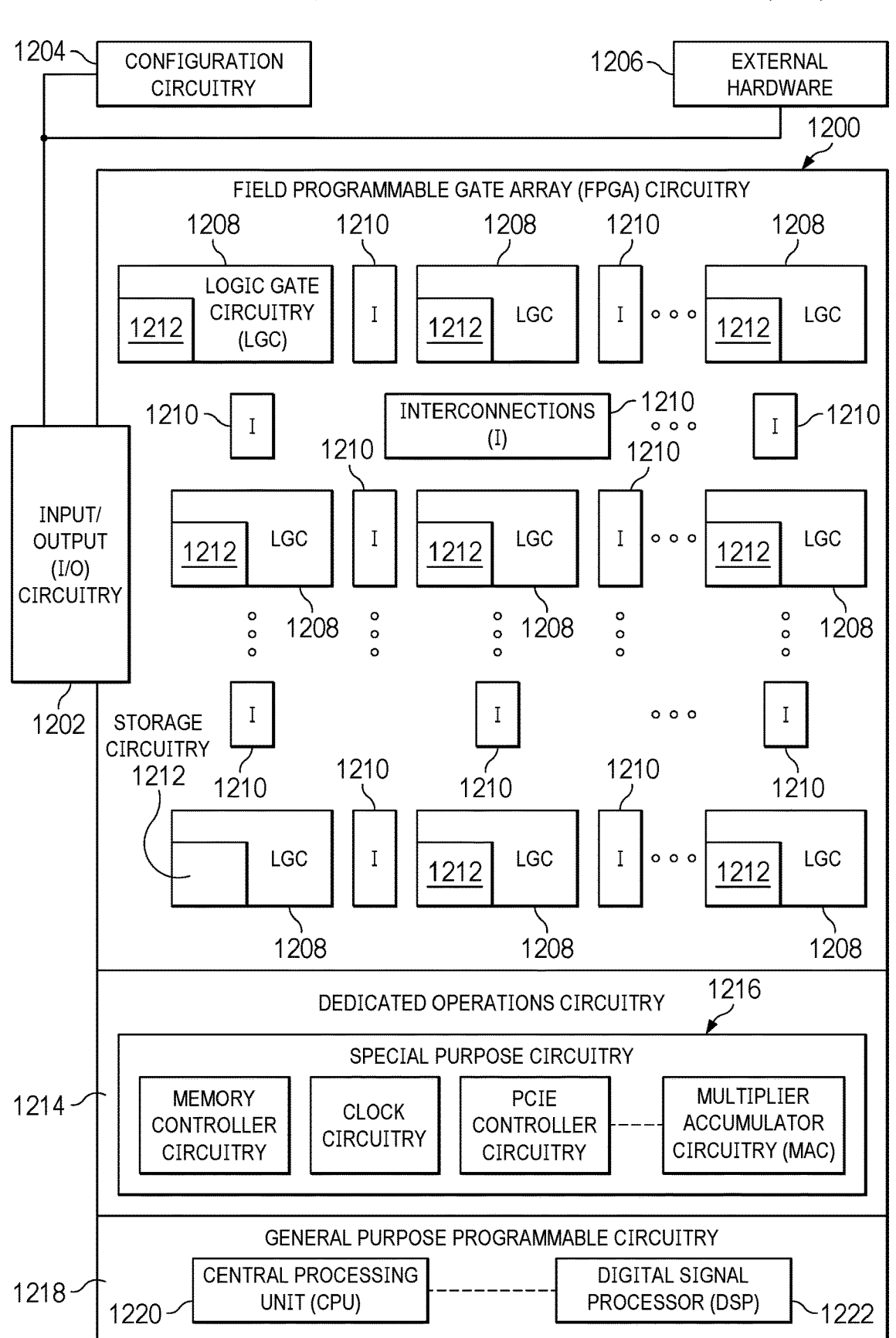
FIG. 12 is a block diagram of another example implementation of the programmable circuitry of FIG. 10.

1200 of FIG. 12 that are structured to perform operations corresponding to the machine-readable instructions. Also or alternatively, the parser 106 may be instantiated by any other combination of hardware, software, or firmware. For example, the parser 106 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

The redactor 111 accesses the simplified chip information file 127 from the parsed data store 110 to generate one or more classified file(s) 128 based on classification schema as described below in connection with FIG. 4. Examples of the classified files 128 may include internal data files and per-customer data files. Internal data files include chip information for internal access only. Per-customer data files include chip information accessible on a per-customer basis (e.g., customer-accessible chip information). For example, one customer may have access to a first subsystem in a chip but not a second subsystem in the chip, and another customer may have access to the second subsystem but not the first subsystem. By classifying chip information into different classified files 128, portions of chip information can be protected from being published to unauthorized parties while at the same time authorizing publication of that chip information to authorized parties. The classified files 128 may be implemented in the JSON format or any other suitable data format. In examples described herein, the parser 106 and the redactor 111 enable publication of the classified files 128 of a corresponding semiconductor chip device as customer-specific TRMs without impacting the generation of other classified files 128 of other semiconductor chip devices.

In some examples, the redactor 111 (e.g., redactor circuitry) is instantiated by programmable circuitry executing augmentation storage interface instructions to perform operations such as those represented by the flowcharts of FIGS. 7 and 8.

In some examples, the computer-based network environment 100 includes means for generating one or more classified file(s) 128 based on classification schema. For example, the means for generating one or more classified file(s) may be implemented by the redactor 111. In some examples, the redactor 111 may be instantiated by programmable circuitry such as the example programmable circuitry 1012 of FIG. 10. For instance, the redactor 111 may be instantiated by the example microprocessor 1100 of FIG. 11 executing machine executable instructions such as those implemented by at least block 806 of FIG. 8. In some examples, the redactor 111 may be instantiated by hardware logic circuitry, which may be implemented by an ASIC, XPU, or the FPGA circuitry 1200 of FIG. 12 that are structured to perform operations corresponding to the machine-readable instructions. Also or alternatively, the redactor 111 may be instantiated by any other combination of hardware, software, or firmware. For example, the redactor 111 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

In the online-mode of example FIG. 1, the filter 112 is executed by a network resource or a cloud-based resource to search or filter through the classified file(s) 128. In some examples, the filter 112 is implemented by the server 114. The filter 112 receives the classified file(s) 128 from the redactor 111 to present their chip information contents to a user via the web app 120. In example FIG. 1, the filter 112 can perform parametric searches of chip information in the classified file(s) 128 based on keywords or search strings provided by a user via an example GUI 130 (e.g., a register viewer user interface) of the web app 120. For example, the client device 116 receives user input such as keywords or search strings via the web app 120 and sends the user input to the server 114 via the network 118. The server then applies the keywords or search strings in the filter 112 to generate filtered information 132. The filtered information 132 includes search results generated by performing the parametric search on the classified file 128. A keyword or search string for a parametric search may be part of a full or partial register name, a full or partial register address, a full or partial bit name, or any other full or partial text located in chip information of a classified file 128. The server 114 communicates the filtered information 136 to the client device 116 via the network 118. The web app 120 displays the filtered information 136 from the parametric search via the GUI 130. The server 114 may be implemented using physical processor-based server hardware that is stand-alone or part of a server rack system. Alternatively, the server 114 may be implemented using a virtual machine or a container instantiated on underlying hardware. The server 114 may be implemented in a client-to-server architecture or in a cloud architecture. The client 116 may be implemented using physical processor-based computer hardware in the form of a desktop computer, a laptop computer, a tablet computer, a smartphone device, etc. In some examples, the client device 116 may be implemented using a virtual machine or a container instantiated on underlying hardware.

The filter 112 can also filter the chip information through a filter hierarchy tree that allows a user to drill down into the chip information over multiple hierarchy levels. Example filter hierarchy levels are shown in FIG. 1 as a first filter level 134a, a second filter level 134b, a third filter level 134c, and a fourth filter level 134d and may filter at, for example, an intellectual property (IP) core level, a chip region level, an instance level, a register level, etc. The filter levels 134a-d may additionally or alternatively include other types of filters such as memory subsystem filters, cache level filters, bus filters, pin-out filters, power plane filters, etc. To implement a hierarchy filter process, a user can select hierarchy filter levels via the GUI 130 of the web app 120. The client device 116 communicates the filter level selections from the web app 120 to the server 114 via the network 118. After receiving a filter level selection, the filter 112 applies the filter level selection to the classified file 128 to generate the filtered information 132. The server 114 communicates the filtered information 136 to the client device 116 via the network 118. The web app 120 displays the filtered information 136 from the hierarchy filter process via the GUI 130.

In some examples, the filter 112 (e.g., filter circuitry) is instantiated by programmable circuitry executing augmentation storage interface instructions to perform operations such as those represented by the flowcharts of FIGS. 7 and 8.

In some examples, the computer-based network environment 100 includes means for searching or filtering chip information. For example, the means for searching or filtering chip information may be implemented by the filter 112. In some examples, the filter 112 may be instantiated by programmable circuitry such as the example programmable circuitry 1012 of FIG. 10. For instance, the filter 112 may be instantiated by the example microprocessor 1100 of FIG. 11 executing machine executable instructions such as those implemented by at least blocks 906-922 of FIG. 9. In some examples, the filter 112 may be instantiated by hardware logic circuitry, which may be implemented by an ASIC, XPU, or the FPGA circuitry 1200 of FIG. 12 that are structured to perform operations corresponding to the machine-readable instructions. Also or alternatively, the filter 112 may be instantiated by any other combination of hardware, software, or firmware. For example, the filter 112 may be implemented by at least one or more hardware circuits (e.g., processor circuitry, discrete or integrated analog or digital circuitry, an FPGA, an ASIC, an XPU, a comparator, an operational-amplifier (op-amp), a logic circuit, etc.) configured or structured to execute some or all of the machine-readable instructions or to perform some or all of the operations corresponding to the machine-readable instructions without executing software or firmware, but other structures are likewise appropriate.

Figure 2:
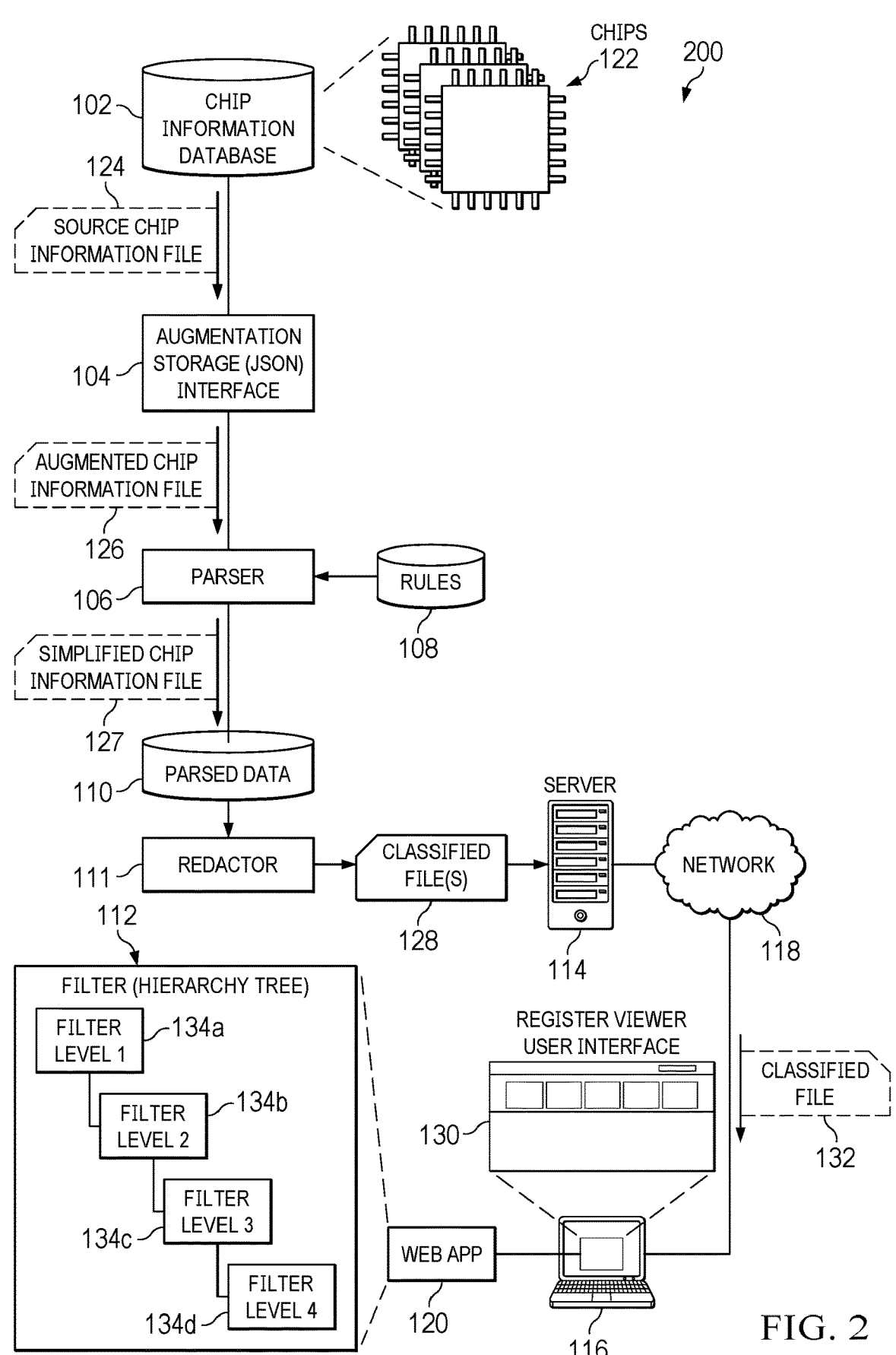
FIG. 2 is a block diagram of an example computer-based network environment in which register information of a semiconductor chip is provided to an end-user in an offline mode.

FIG. 2 is a block diagram of an example computer-based network environment 200 in which register information of a semiconductor chip is provided to an end-user in an offline mode. The computer-based network environment 200 includes substantially the same components as described above in connection with FIG. 1. For purposes of brevity, descriptions of those components are not repeated for example FIG. 2. Instead, the interested reader is referred to the corresponding descriptions provided above in connection with FIG. 1.

To implement the off-line mode, the computer-based network environment 200 differs from the computer-based network environment 100 of FIG. 1 in that the filter 112 is moved from a network resource (e.g., the server 114) or a cloud resource to the web app 120 executed by the client device 116. As shown in FIG. 2, the filter 112 can operate in an off-line mode because the client device 116 receives a classified file 128 from the server 114 via the network 118. The client device 116 stores the classified file 128 in local memory or storage so that the filter 112 can be applied to the chip information in the classified file 128 locally in the client device 116. In this manner, the client device 116, after receiving the classified file 128, can be disconnected from the network 118 and, thus, operate in an off-line mode. During such off-line mode, a user can interact with the web app 120 via the GUI 130 to control filter selection or parametric search functionality of the filter 112 on the off-line classified file 128. Such off-line mode of operation can be useful when the client device is outside of network range. For example, a user may be traveling with the client device 116 on an airplane or in any other vehicle or may be located in a remote area in which the user is unable to connect the client device 116 to a network.

The augmentation storage interface 104, the parser 106, the redactor 111, and the filter 112 of FIGS. 1 and 2 may be instantiated (e.g., creating an instance of, bring into being for any length of time, materialize, implement, etc.) by programmable circuitry such as a Central Processor Unit (CPU) executing first instructions. Also or alternatively, the augmentation storage interface 104, the parser 106, the redactor 111, and the filter 112 of FIGS. 1 and 2 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 2 may, thus, be instantiated at the same or different times. Some or all of the circuitry of FIG. 2 may be instantiated, for example, in one or more threads executing concurrently on hardware or in series on hardware. Moreover, in some examples, some or all of the circuitry of FIG. 2 may be implemented by microprocessor circuitry executing instructions or FPGA circuitry performing operations to implement one or more virtual machines or containers.

Figure 3:
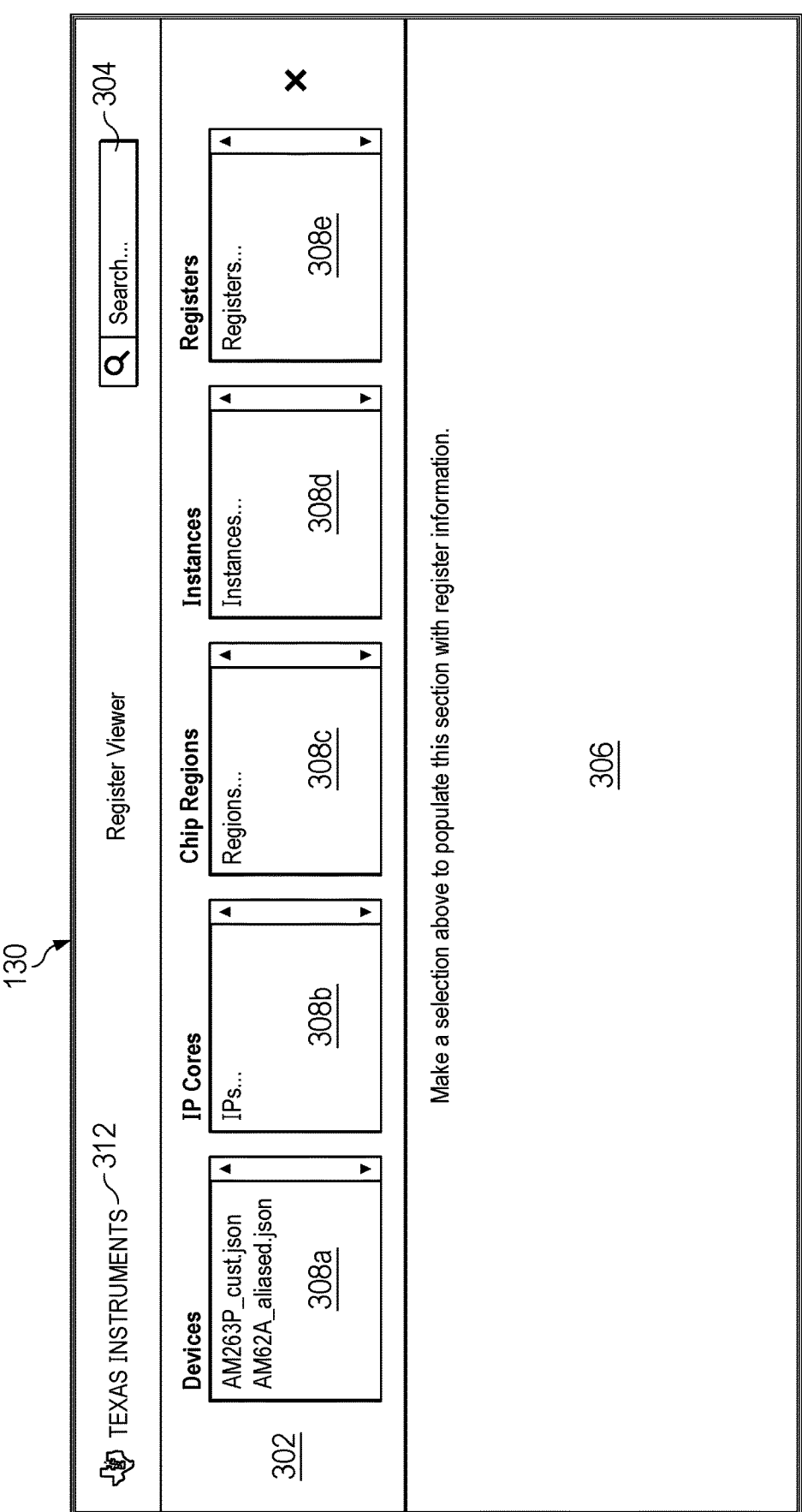
FIG. 3 is an example graphical user interface of the computer-based network environments of FIG. 1 and/or FIG. 2 to navigate chip information and present chip information to an end-user.

FIG. 3 is an example GUI 130 of the online-mode computer-based network environment 100 of FIG. 1 and the offline-mode computer-based network environment 200 of FIG. 2 to navigate chip information and present chip information to an end-user. For example, when implemented in connection with the computer-based network environment 100, the GUI 130 works based on a network connection (e.g., the Internet) to communicate with the filter 112 to receive the filtered information 132 via the network 118. When implemented in connection with the computer-based network environment 200, the GUI 130 works without a network connection by communicating with the filter 112 in the local client device 116 to receive filtered information (e.g., the filtered information 132) locally. In any case, the GUI 130 is shown on a display and is controlled by the client device 116. For example, a processor circuitry instructs the display of the client device 116 to show the GUI 130 and the different user interface control objects and information objects of the GUI 130.

The GUI 130 is a graphical user interface (GUI) that includes an example filter section 302, an example parametric search field 304, and an example register information view section 306. The filter section 302 provides menu-based filtering and includes a plurality of hierarchical user input fields (e.g., GUI selection controls) corresponding to different hierarchy levels of chip information available in the classified file 128. In example FIG. 3, the filter hierarchy levels are shown as devices, IP cores, chip regions, instances, and registers. To apply a hierarchical level filter based on devices, the filter section 302 is provided with a device selection control 308a. To apply a hierarchical level filter based on IP cores, the filter section 302 is provided with an IP cores selection control 308b. To apply a hierarchical level filter based on regions, the filter section 302 is provided with a chip regions selection control 308c. To apply a hierarchical level filter based on instances, the filter section 302 is provided with an instance selection control 308d. To apply a level filter based on registers, the filter section 302 is provided with a register selection control 308e. Using the menu-based GUI selection controls 308a-e, a user can traverse registers through user selection that follows different paths through device name selection, IP core name selection, chip region name selection, instance name selection, and register name selection to filter down to a specific register table for viewing.

In FIG. 3, example names of two devices are shown in the device selection control 308a. In response to the device selection control 308a receiving a user selection of one of the listed devices, the filter 112 applies the first filter level 134a (FIGS. 1 and 2) to filter out chip information unrelated to the selected device. In doing so, the filter 112 provides the GUI 130 with names of IP cores tagged or labeled in the classified file 128 as corresponding to the selected device. The GUI 130 displays the names of the IP cores in the IP cores selection control 308b. In response to the IP cores selection control 308b receiving a user selection of a listed IP, the filter 112 applies the second filter level 134b (FIGS. 1 and 2) to filter out chip information unrelated to the selected IP core. In doing so, the filter 112 provides the GUI 130 with names of chip regions tagged or labeled in the classified file 128 as corresponding to the selected IP core. The GUI 130 displays the names of the chip regions in the chip region selection control 308c.

In response to the chip regions selection control 308c receiving a user selection of a listed chip region, the filter 112 applies the third filter level 134c (FIGS. 1 and 2) to filter out chip information unrelated to the selected chip region. In doing so, the filter 112 provides the GUI 130 with names of instances tagged or labeled in the classified file 128 as corresponding to the selected chip region. The GUI 130 displays the names of the instances in the instance selection control 308d. In response to the instance selection control 308d receiving a user selection of a listed instance, the filter 112 applies the fourth filter level 134d (FIGS. 1 and 2) to filter out chip information unrelated to the selected instance. In doing so, the filter 112 provides the GUI 130 with names of registers tagged or labeled in the classified file 128 as corresponding to the selected instance. The GUI 130 displays the names of the registers in the register selection control 308e. In response to the register selection control 308e receiving a user selection of a listed register, the filter 112 provides the corresponding register information to the GUI 130, and the GUI 130 displays the register information in the register information view section 306. Example register information includes bitfield figures, bitfield names, bitfield definitions, bitfield value definitions, reset information, etc.

The parametric search field 304 allows users to perform direct register address searches by searching for a specific register name, a specific register address, or a partial path. For example, a user can enter user-provided search text such as search terms, search characters, etc. via the parametric search field 304 that the filter 112 uses to create a search string. The filter 112 applies the search string to search through chip information in the classified file 128. The filter 112 provides search results to the GUI 130, and the GUI 130 displays a listing of the search results in the register information view section 306. In response to receiving a user selection of one of the search results, the filter 112 provides the corresponding register information to the GUI 130, and the GUI 130 displays the register information in the register information view section 306. The filter 112 also provides to the GUI 130 the device name, the IP core name (e.g., IP identifier), the chip region name (e.g., chip region identifier), the instance name (e.g., instance identifier), and the register name (e.g., register identifier) corresponding to the selected search result. As such, in addition to displaying the register information in the register information view section 306, the GUI 130 also displays the corresponding device name in the device name selection control 308a, the corresponding IP core name in the IP core selection control 308b, the corresponding chip region name in the chip region selection control 308c, the corresponding instance name in the instance selection control 308d, and the corresponding register name in the register selection control 308e.

The GUI 130 includes an example customizable banner section 312 in which different names (e.g., company names, customer names, etc.) can be displayed. In this manner, when the web app 120 is distributed to different customers, the customizable banner section 312 can be customized in appearance for those customers. For example, the web app 120 may be configured to display a company name of the customer as a title banner in the customizable banner section 312. In some examples, a landing page of the web app 120 may also be customized to show a particular customer's name. Customizing the web app 120 in this manner creates a tailored customer experience and impression that a customer can expect to see chip information of a semiconductor chip that is relevant to a design of that customer.

Figure 4:
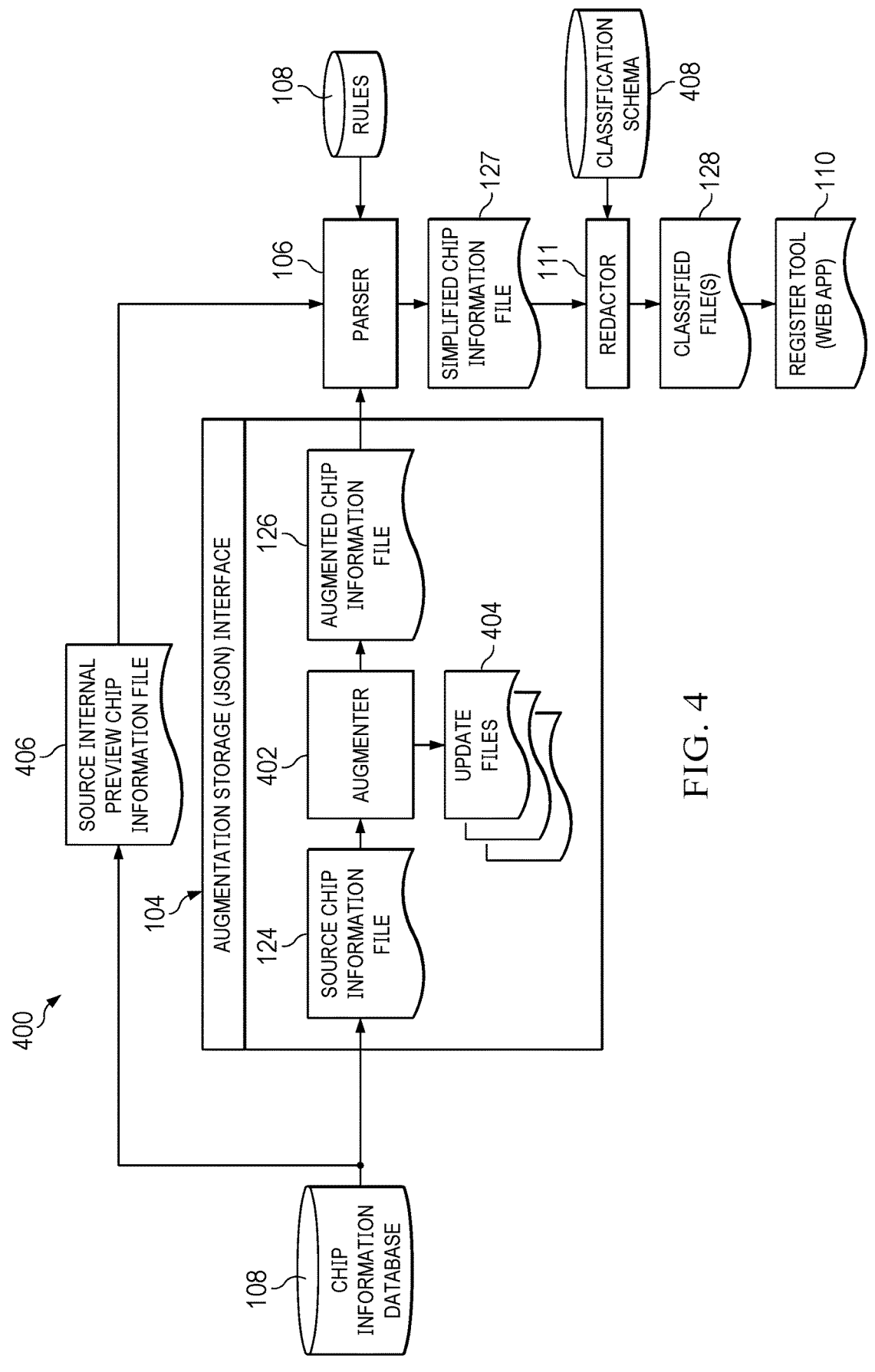
FIG. 4 is an example dataflow diagram representing how chip information is processed in accordance with teachings described herein to present via a web app.

FIG. 4 is an example dataflow diagram 400 representing how chip information is processed to present register information via the web app 120 of FIGS. 1-3. Example FIG. 4 shows the augmentation storage interface 104 coupled to the chip information database 102 and the parser 106. The augmentation storage interface 104 includes an augmenter 402 that accesses the source chip information file 124 from the chip information database 102 and generates the augmented chip information file 126. The augmenter 402 uses example update files 404 to generate the augmented chip information file 126 as a more manageable list of chip information. The update files 404 include rules, keywords, labels, tags, or any other suitable information that the augmenter 402 can use to detect missing data, internal-only data, mis-formatted data in the source chip information file 124.

The augmenter 402 adapts the data and structure of the data in the source chip information file 124 to a pre-parse format (e.g., the augmented chip information file 126) that is more manageable by filling in missing data and scaling back other data provided by the chip information database 102 but not meant for external release. Missing data may be formatting data that delineates information of one register from information of another register. In such examples, the augmenter 402 detects the lack of formatting to separate two different sections of register information and adds the corresponding formatting data. Data intended for internal use only (e.g., not to be released external to the chip design company) may include information for internal debug registers, internal test mode registers, experimental registers, registers corresponding to incomplete or non-operational chip sub-systems, etc. In any case, the augmenter 402 removes register information and references to such registers from the source chip information file 124 to omit it from the augmented chip information file 126.

The parser 106 is implemented using hypertext markup language (HTML) code and cascading style sheets (CSS) infrastructure. The parser 106 accesses the augmented chip information file 126 from the augmentation storage interface 104. The augmented chip information file 126 could include several gigabytes (GBs) of information. To generate a simplified chip information file 127, the parser 106 performs a data reduction process by parsing out information from the augmented chip information file 126 to reduce the amount of information in the simplified chip information file 127 to megabytes (MBs) of information. The reduced amount of information selected by the parser 106 is information pertinent to customers assigned access privileges to access the classified file(s) 128. As such, the parser 106 generates the simplified chip information file 127 to have a reduced file size relative to the file size of the augmented chip information file 126 based on chip information relevant to customers or particular groups of customers that will eventually access the classified file(s) 128. Reducing file size improves the operation of a computer (e.g., the client device 116 of FIGS. 1 and 2) used to access the chip information because the reduced file size of the resulting classified file 128 allows the computer to load the classified file 128 more quickly into local system memory (e.g., synchronous dynamic random access memory (SDRAM)). The reduced file size also allows the computer to load and buffer more chip information that is relevant to a customer into local system memory so that accesses of the chip information can be performed faster from that local system memory rather than having to fetch data from a slower mass storage device (e.g., network-connected storage, a hard disk drive (HDD), a solid state drive (SSD), etc.).

During a data reduction process, the parser 106 applies a hierarchical data formatting structure to translate the chip information from the augmented chip information file 126 to the simplified chip information file 127. In translating the chip information, the parser 106 generates register definitions for registers represented in the chip information. An example register definition 500 that may be generated by the parser 106 is shown in FIG. 5. The hierarchal data formatting structure organizes chip information of a semiconductor chip according to hierarchy levels based on structures or regions of the semiconductor chip. Example levels of a semiconductor chip include IP cores, chip regions, instances, and registers. As used herein, an IP core is a circuit design and/or functional design that is reusable and may be incorporated into multiple semiconductor chip designs to implement functionality corresponding to that circuit and/or functional design. In some examples, IP cores may be stored in circuit design libraries and selected by chip designers from such libraries during a chip design phase. As used herein, a chip region is a region of circuitry on a semiconductor chip design that is assignable for use to implement circuitry corresponding to a circuit design and/or a functional design. As used herein, a design instance is an implementation or an occurrence of a circuit design and/or a functional design in a semiconductor chip. As used herein, a register is a durable array of bit locations in a semiconductor chip to store information available to a circuit of the semiconductor chip during operation of that circuit. For example, a processor core in a semiconductor chip may be designed to include a plurality of registers available to the processor core during operation to store immediately available information such as operands, memory addresses, configuration information, etc.

The parser 106 also removes redundant information (e.g., deduplicate chip information) from the augmented chip information file 126 to generate deduplicated chip information. For example, some chip information may be duplicated across multiple sections of the augmented chip information file 126. The parser 106 may use combination rules or breakup rules in a rules store 108 that specify how to combine or breakup register information of IP cores in the augmented chip information file 126. The rules store 108 may include combination rules and breakup rules based on universal register use, group register use, device register use, and IP register use. Universal register use corresponds to how registers are structured in IP cores used in different chip designs across a chip design company. Group register use corresponds to how registers are structured for chips by a particular design group in a chip design company. Device register use corresponds to how registers are structured in a particular chip design. IP register use corresponds to how registers are structured in a particular IP core. The rules store 108 may also include naming convention rules based on universal naming conventions, group naming conventions, device naming conventions, and IP naming conventions. Universal name conventions correspond to how registers are named in IP cores used in different chip designs across a chip design company. Group name conventions correspond to how registers are named for chips by a particular design group in a chip design company. Device name conventions correspond to how registers are named in a particular chip design. IP name conventions correspond to how registers are named in a particular IP core.

The parser 106 also uses the rules in the rules store 108 to remove internal information pertaining to chip design but is not relevant to documenting for system developers. The parser 106 also adds information to generate final outputs (e.g., the classified file(s) 128). For example, the parser 106 fills in missing data based on rules in a rules store 108 that specify how to determine and fill in the missing data. Missing data may be in the form of register bit values left blank by chip design engineers because there are no values for those bits that are meaningful to customers. In such examples, the augmentation storage interface 104 compensate for such missing data by filling in register bit values or performing some other corrective action.

In addition, the rules in the rules store 108 may specify how to determine and/or add to the chip information one or more of: (1) start bits, (2) stop bits, (3) sizes of bit fields, (4) what words/descriptions to use as placeholders to fill in missing register bits (e.g., "undefined," "TBD" (e.g., to be determined (TBD), "reserved," "hidden," "RSVD," "reserved_#", etc.), (5) bitfield descriptions to include/exclude, (6) bitfield descriptions for parameters (e.g., sub-tables), (7) an interrupt source to specify for a bitfield, (8) bitfield descriptions for tag processing (e.g., designers may assign different tags to different descriptions intended for internal access only, or intend for access by different customers), (9) what classification to apply to a bitfield (e.g., an entire bitfield may be classified for privileged access internally or by certain parties), (10) what reset value to assign to each bit in each register, (11) what classifications to apply at an IP core level, at a region level, at a register level, at a bitfield level, etc. so that information is correctly distributed/published across corresponding classified files 128, (12) how to organize register descriptions based on primary offsets of the registers relative to their base address, (13) product name, etc.

The rules in the rules store 108 used by the parser 106 also define how to group and present the chip information. For example, the parser 106 can use the rules in the rules store 108 to identify how to combine or not combine multiple copies of chip information related to the same IP core. In some examples, the parser 106 uses the rules in the rules store 108 to eliminate duplicate information and consolidate duplicate copies into a single entry based on base addresses of IP cores. The parser 106 can also use the rules in the rules store 108 to confirm duplicates of IP core information regardless of different IP core names and differences between IP core information. For example, two copies of chip information for the same IP core may be located in two sections of the augmented chip information file 126. The two chip information copies may be labeled using different IP core names even though they pertain to the same IP core in a chip. The two chip information copies may also share some common information but have other information not found in both of the chip information copies. In such examples, the parser 106 uses the rules in the rules store 108 to determine how to merge the two chip information copies without duplicating data so that the IP core is represented using only a single copy of the combined chip information. In this manner, the parser 106 can deduplicate chip information from the augmented chip information file 126.

The parser 106 can also use the rules in the rules store 108 to identify situations in which two or more chip information entries corresponding to two or more different IP cores that have the same name. In such examples, the same name may create confusion by implying that the two or more different IP cores are actually the same IP core. However, the rules in the rules store 108 can be defined to specify that the parser 106 is to determine that the two chip information entries labeled with the same IP core name actually correspond to two different IP cores when a threshold number of differences exist between the two chip information entries. In such examples, the parser 106 can rename one, or both of the IP cores to distinguish them at the name level.

The parser 106 also uses the rules in the rules store 108 to create summaries of register information that provide a short high-level view of the contents of a classified file 128. The parser 106 also organizes names of IP cores, chip regions, instances, and registers in a hierarchy tree for quick reproduction for display via a web app (e.g., the web app 120).

The parser 106 provides the simplified chip information file 127 to the redactor 111. The redactor 111 performs a redaction process to redact chip information in the simplified chip information file 127 into the classified file(s) 128 based on a classification schema 408. The classification schema 408 stores customer names or customer identifiers in association with classification privilege levels corresponding to different portions of chip information in the simplified chip information file 127. For example, classification privilege levels may be applied at one or more of the IP core level, the chip region level, the instance level, the register level, or the bitfield level. Classification privilege levels for the chip information may be based on one or both of user-level privileges or group-level privileges for different classifications (e.g., internal-only files, public files, customer-specific files, etc.). A user-level privilege is assigned to a particular person. A group-level privilege is assigned to multiple users that are associated with a same group. For example, a user-level privilege may be tied to a particular username and a group-level privilege may be tied to a group name for a group having multiple members. In a company, one group name may be "chip design engineering" and another group name may be "field support engineering". In such an example, the "chip design engineering" group may be assigned full access privileges to chip information due to members of that group being involved in designing every aspect of a semiconductor chip. Individual user members of the "chip design engineering" inherit the full access privileges. However, the "field support engineering" group may be assigned only partial access privileges to the chip information due to members of that group sharing information with outside customers and needing to protect some of the chip information from exposure to third parties.

To generate the classified file(s) 128, the redactor 111 extracts chip information to be published and classification privilege levels from the simplified chip information file 127. For example, classification privilege levels may be stored in the chip information database as classification tags or labels in association with corresponding chip information. A classification tag or label identifies a class of customer or a privilege level allowed to access corresponding register information. Such classification tags or labels follow their corresponding register information to the simplified chip information file 127 for use by the redactor 111 to redact the chip information from the simplified chip information file 127 into corresponding ones of the classified file(s) 128 for different customers based on the classification schema 408.

In some examples, the redactor 111 may output the classified file(s) 128 in a human-readable file format, such as a spreadsheet or word processing document, to be provided to a user instead of being output via the web app 120 and its GUI 130 described above in connection with FIGS. 1-3. Examples of human-readable file formats that may be employed by the redactor 111 include a spreadsheet format (e.g., a Microsoft® Excel® spreadsheet format), a word processing document format (e.g., a Microsoft® Word document format), an extensible Markup Language (XML) format, an American Standard Code for Information Interchange (ASCII) format, a Darwin Information Typing Architecture (DITA) format, a component content manage system (CCMS) format, a Portable Document Format (PDF), a HyperText Markup Language (HTML) format, etc. Additionally or alternatively, the redactor 111 may output the classified file(s) 128 in any other format to be presented by a file viewer different from the web app 120 and its GUI 130. In any case, the classified file(s) 128 generated by the redactor 111 serve as technical reference manuals (TRMs) of a chip for different customers.

In example FIG. 4, the parser 106 also receives a source internal preview chip information file 406 from the chip information database 102. The source internal preview chip information file 406 is provided to generate internal preview versions of classified file(s) 128 what will be given to customers. However, since the source internal preview chip information file 406 bypasses the augmentation storage interface 104, internal-only information is not removed from the source internal preview chip information file 406. This internal-only information can be viewed by internal chip designers of a chip design company in context with other chip information as organized by the parser 106 and the redactor 111 when generating the simplified chip information file 127 and the classified file(s) 128.

In the offline mode described above in connection with FIG. 2, the classified file(s) 128 are provided to the web app 120, as shown in FIG. 4, so that the web app 120 can apply the filter 112 (FIGS. 1 and 2) to the chip information in the classified file(s) 128 without needing to be connected to a network (e.g., the network 118 of FIGS. 1 and 2). However, in the online mode described above in connection with FIG. 1, the classified file(s) 128 are provided to the filter 112 executed in a network resource (e.g., the server 114 FIG. 1) or a cloud resource so that the filter 112 can generate the filtered information 132 (FIG. 1) for sending to the web app 120 via the network 118.

Figure 6:
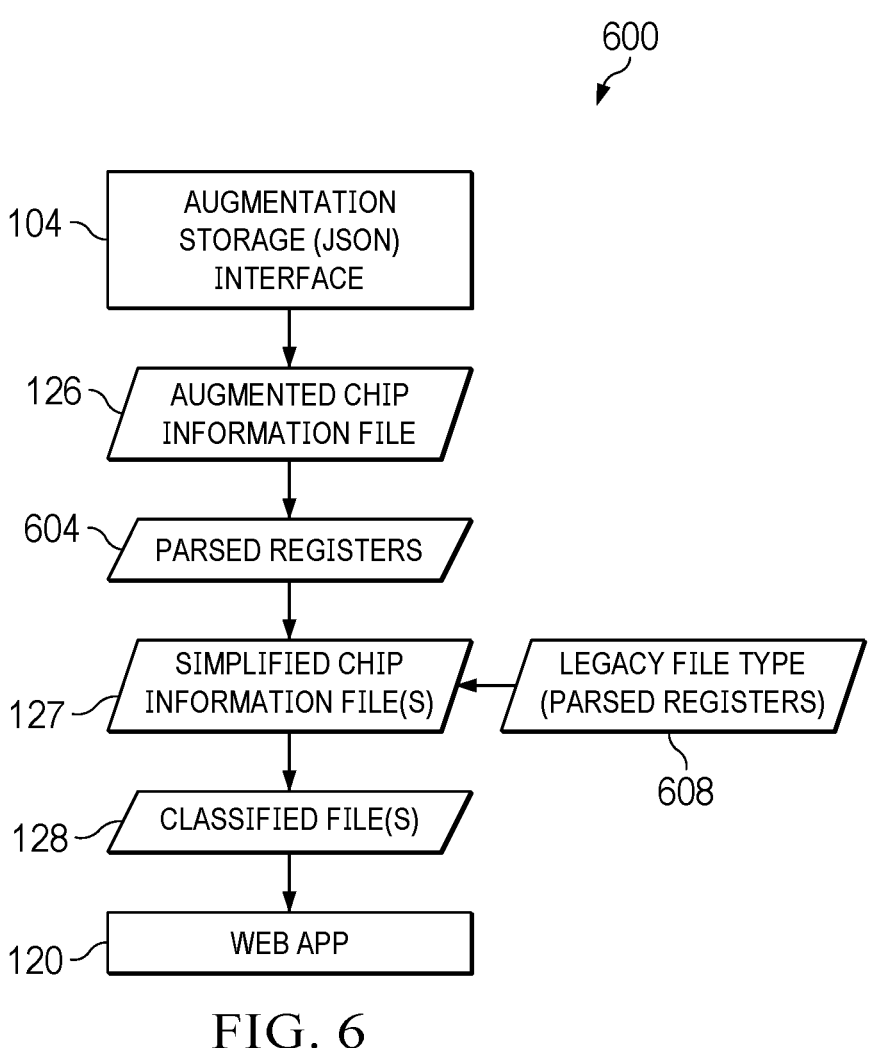
FIG. 6 is another example dataflow diagram representing how chip information is processed in accordance with teachings described herein to present via a web app.

FIG. 6 is another example dataflow diagram 600 representing how chip information is processed to present register information via the web app 120 of FIGS. 1-3. In the data flow diagram 600, the augmentation storage interface 104 generates the augmented chip information file 126. The parser 106 (FIGS. 1, 2, and 4) parses the augmented chip information file 126 to generate parsed registers 604 as described above in connection with FIG. 4. The parser 106 also receives parsed files from one or more legacy file type(s) 608. For example, parsed registers of a legacy file type 608 may be generated by an external process that receives files structured using one or more different formatting types than interpretable by the augmentation storage interface 104. The parser 106 can merge the parsed registers of the legacy file type(s) 608 with the parsed registers 604 from the augmented chip information file 126 to generate the simplified chip information file 127.

The redactor 111 (FIGS. 1, 2, and 4) generates the classified file(s) 128 based on the simplified chip information file 127 as described above in connection with FIG. 4. In the offline mode described above in connection with FIG. 2, the classified file(s) 128 are provided to the web app 120, as shown in FIG. 6, so that the web app 120 can apply the filter 112 (FIGS. 1 and 2) to the chip information in the classified file(s) 128 without needing to be connected to a network (e.g., the network 118 of FIGS. 1 and 2). However, in the online mode described above in connection with FIG. 1, the classified file(s) 128 are provided to the filter 112 executed in a network resource (e.g., the server 114 FIG. 1) or a cloud resource so that the filter 112 can generate the filtered information 132 (FIG. 1) for sending to the web app 120 via the network 118.

FIG. 7 is a flowchart representative of example machine-readable instructions 700 and/or example operations that may be executed, instantiated, and/or performed using an example programmable circuitry implementation of the parser 106 and the redactor 111 of one or more of FIGS. 1, 2, 4, and 6 to generate the classified file(s) 128 (FIGS. 1, 2, 4, and 6) for use as filterable and searchable technical reference manuals (TRMs). The filterable and searchable TRMs are generated to be accessible by users using the GUI 130 of FIG. 3. The machine-readable instructions 700 may be one or more executable programs or portion(s) of one or more executable programs for execution by programmable circuitry such as the programmable circuitry 1012 shown in the example processor platform 1000 discussed below in connection with FIG. 10 and may be one or more function(s) or portion(s) of functions to be performed by the example programmable circuitry discussed below in connection with FIG. 11 or 12.

In example FIG. 7, the parser 106 is configured based on configuration information in an example configuration file 701. For example, the configuration file 701 may include the file type (e.g., a JSON file type) of the augmented chip information file 126 to be processed by the parser 106. The configuration file 701 may also specify the types of output formats/files to be generated. For example, the configuration file 701 may specify that register information is to be output in a JSON format, a spreadsheet format, a word processing document format, an XML format, an ASCII format, a DITA format, a CCMS format, a PDF format, an HTML format, etc. The configuration file 701 may also specify a template file name for a chip support package (CSP), which is a collection of XML that is used in Code Composer Studio (e.g., an integrated development environment (IDE) for microcontrollers and processors of Texas Instruments, Inc.) to define state values from register information. Alternatives to Code Composer Studio that may be employed include Microsoft® Visual Studio®, AWS® Cloud9®, or any other suitable IDE. The configuration file 701 may also specify the types of operations (e.g., determine device, determine duplicate IP cores, etc.) to be performed by the parser 106. As also shown in example FIG. 7, the parser 106 accesses the rules in the rules store 108 to combine or breakup register information of IP cores in the augmented chip information file 126.

The instructions 700 begin at block 702 at which the parser 106 performs a data reduction process on the augmented chip information file 126. For example, the parser 106 performs a data reduction process by parsing out information from the augmented chip information file 126 to reduce the amount of information in the simplified chip information file 127 as described above in connection with FIG. 4. The parser 106 also adapts the chip information in the augmented chip information file 126 to a multi-dimensional array (block 704). For example, the parser 106 uses arrays of register definitions to reduce duplicate presentation of iterative register files. The parser 106 can pack such register files in up to a four-dimensional array, $\_j/\_k/\_l/\_m$.

Accordingly, in some examples, the parser 106 formats register information in the augmented chip information file 126 to an _j/_k/_l/_m array. In such a multi-dimensional array, for identical information with corresponding names such as ADC_Register_FunctionA_0-9 (e.g., it is repeated 10 times), instead of repeating this identical information, the identical information is defined in a multi-dimensional array as j where j=0-9. Such arrayed registers can stack, for example, Register_FunctionA_j_SettingB_k, where j=0-5 and k=0-99. This example saves 500 pages of duplicate information.

The parser 106 performs blocks 706, 708, 710, as described below, based on combination rules and/or breakup rules in the rules store 108 (FIGS. 1 and 4) to combine register information when possible or to store register information separately for two different IP cores. At block 706, the parser 106 compares register counts and data of IP cores to detect identical information that exists within region information. The parser 106 performs this comparison to combine register information when possible. That is, there may be two instances of the same IP core in a chip. For example, an IP core may be circuitry to implement a universal serial bus (USB) interface IP core, a display interface IP core, a video compression IP core, a data encryption IP core, etc. When multiple copies or instances of the same IP core are fabricated in a chip (e.g., a chip to provide multiple USB interface, multiple display interfaces, etc.), all of the instances of that IP core have respective instantiations or copies of substantially the same registers. Since the register information is substantially the same for all instances of the same IP core, the parser 106 can deduplicate register information repeated in the augmented chip information file 126 by providing only one occurrence of the same register information for all instances of the same IP core and noting that the registers of the separate IP core instances are addressable in register space (or memory space) of a chip at different base addresses.

In the comparisons of block 706, a register count represents a number of registers documented in the augmented chip information file 126 for an IP core of a chip. As such, comparing one register count of one IP core register description in the augmented chip information file 126 to another register count of another IP core register description in the augmented chip information file 126 can be used to make an inference of whether two separate IP core register descriptions in the augmented chip information file 126 refer to two instances of the same IP core in a chip. When the parser 106 makes such an inference, it can perform a data comparison which involves comparing information across the register-level descriptions of two IP core register descriptions in the augmented chip information file 126. If the register-level descriptions of both IP core register descriptions include identical data or substantially similar data within a threshold amount, the two register-level descriptions are regarded as combinable into a single occurrence for both IP core instances. The threshold level amount of information that must match between two register-level descriptions can be selected to any suitable amount to accurately detect duplicate register-level descriptions.

If there is a register count match and data between two IP core register descriptions satisfy a threshold level of similarity (block 706: Same), the parser 106 adds the IP base address of each IP core instance to an IP instances list (block 708). An IP base address of an IP core instances is a register base address at which registers for that IP core instances can be accessed. For example, an IP instances list for an IP core includes the IP base addresses (e.g., register base addresses)

of all instances of that same IP core in a chip so that a developer reviewing the register information can know the base addresses at which registers for corresponding IP core instances can be programmed. When a register count of an IP core register description in the augmented chip information file 126 does not match any other IP core register description (block 706: Different), the parser 106 adds a new IP core name and IP base address to an IP definitions list (block 710). Multiple iterations of blocks 706, 708, and 710 may be performed to analyze IP core register descriptions of multiple IP core instances in a chip.

At block 712, the parser 106 processes IP/region breakup instructions. For example, the parser 106 defines unique handling of different IP cores sharing the same name. That is, some IP cores have the same name but correspond to different versions (e.g., an instance of a USB-C IP core with display output capabilities and another instance of the USB-C IP core without display output capabilities). These different IP core instances with the same name have different registers and information relative to one another. In such examples, for a subsystem defined as a single IP core, the parser 106 can present it as a unique IP core because it does not have the same registers as other IP core instances of the same name. In addition, the parser 106 may detect IP core instances having the same name but different regions and, therefore, should be represented in the chip information as two different IP cores with different register information.

At block 714 the parser 106 calculates and fills in missing information for each bitfield of each register. For example, the parser 106 can provide the missing information as described above in connection with FIG. 4. At block 716, the parser 106 creates a monotable of the augmented register information. For example, an ASCII table using monospace may be used to represent enumerated information in a monotable data structure (e.g., a table represented as ASCII art). The parser 106 may create the monotable data structure using the rules in the rules store 108 as described above in connection with FIG. 4. At block 718, the parser 106 sorts descriptions of bitfields and registers in ascending order to generate the simplified chip information file 127. For example, the ascending order may be based on register base addresses of the registers.

At block 720, the redactor 111 reprocesses the register information in the simplified chip information file 127 and generates the classified file(s) 128 based on the classification schema 408 (FIG. 4). For example, the redactor 111 can generate the classified file(s) 128 as described above in connection with FIG. 4. The classified file(s) 128 can be provided to end users as TRMs that are filterable and searchable via the GUI 130 to access chip information for which those end users have access privileges. The example instructions 700 of FIG. 7 end.

FIG. 8 is a flowchart representative of example machine-readable instructions 800 and/or example operations that may be executed, instantiated, and/or performed using an example programmable circuitry implementation of the parser 106 and the redactor 111 of one or more of FIGS. 1, 2, 4, and 6 to generate the classified file(s) 128 (FIGS. 1, 2, 4, and 6) for use as filterable and searchable TRMs. The filterable and searchable TRMs are generated to be accessible by users using the GUI 130 of FIG. 3. The machine-readable instructions 800 may be one or more executable programs or portion(s) of one or more executable programs for execution by programmable circuitry such as the programmable circuitry 1012 shown in the example processor platform 1000 discussed below in connection with FIG. 10 and may be one or more function(s) or portion(s) of functions to be performed by the example programmable circuitry discussed below in connection with FIG. 11 or 12.

The instructions 800 begin at block 802 at which the augmentation storage interface 104 accesses chip information. For example, the augmentation storage interface 104 can access the chip information in the chip information database 102 for one or more semiconductor chips. The parser 106 removes redundant information from the chip information to generate deduplicated chip information (block 804). For example, the parser 106 can deduplicate the chip information by removing redundancies based on the rules in the rules store 108 as described above in connection with FIG. 4. In example FIG. 8, the parser 106 stores the deduplicated chip information generated at block 804 in the simplified chip information file 127 (FIGS. 1, 4, and 7).

The redactor 111 classifies the deduplicated chip information into respective classified chip information (block 806). For example, the redactor 111 may classify the deduplicated chip information from the simplified chip information file 127 based on the classification schema 408 (FIG. 4) to generate first classified chip information corresponding to a first access permission (e.g., a first access privilege) and second classified chip information corresponding to a second access permission (e.g., a second access privilege). The redactor 111 stores resulting classified chip information sets in respective classified files 128 (block 808). For example, the redactor 111 stores first classified chip information corresponding to a first access permission in a first classified file in memory (e.g., the memory 1014 of FIG. 10) or storage (e.g., the mass storage device 1028 of FIG. 10) and second classified chip information corresponding to a second access permission in a second classified file in the memory or the storage. The classified file(s) 128 can be provided to end users as TRMs that are filterable and searchable via the GUI 130 to access chip information for which those end users have access privileges. The instructions 800 of FIG. 8 end.

Figure 9:
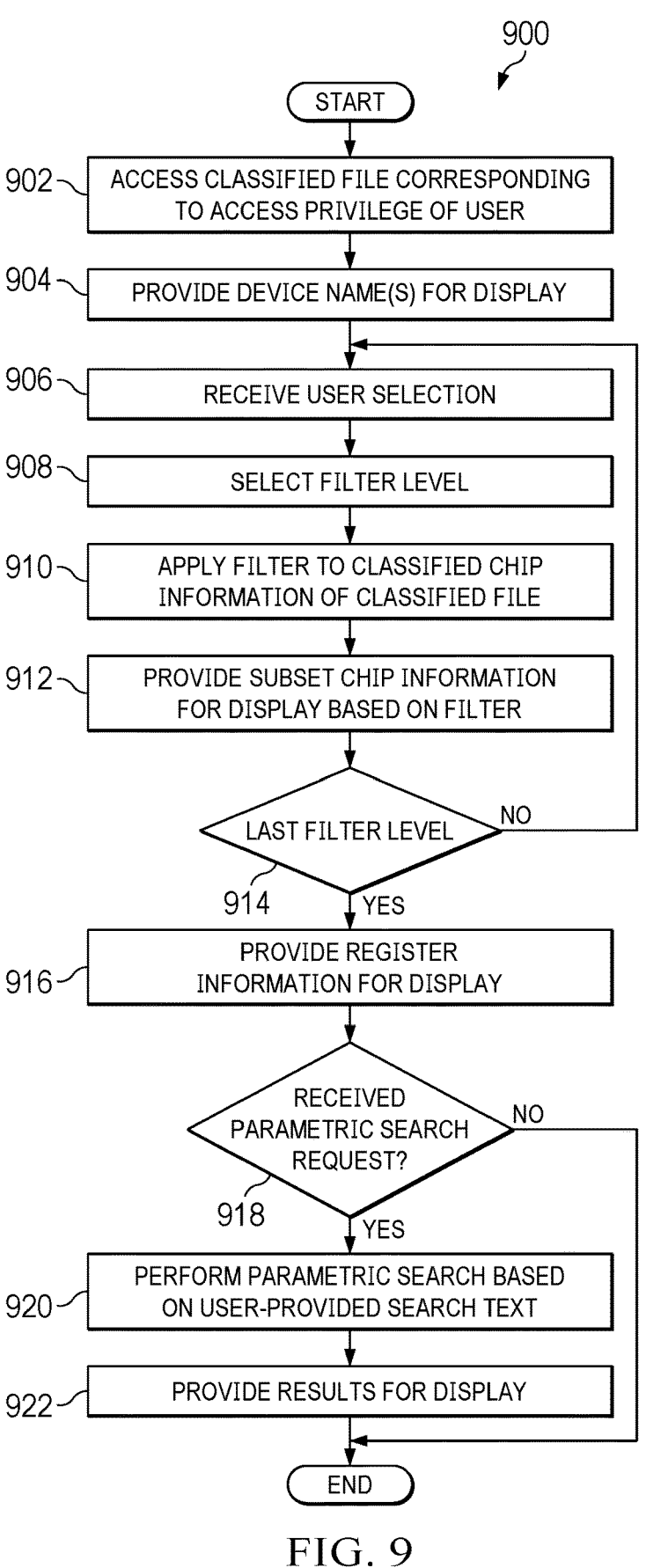
FIG. 9 is a flowchart representative of example machine-readable instructions and/or example operations that may be executed, instantiated, and/or performed using an example programmable circuitry implementation of the example filter and web app of FIGS. 1, 2, 4, and 6 to filter, search, and/or display chip information.

FIG. 9 is a flowchart representative of example machine-readable instructions and/or example operations that may be executed, instantiated, and/or performed using an example programmable circuitry implementation of the filter 112 and the web app 120 of FIGS. 1, 2, 4, and 6 to filter, search, and/or display chip information. The machine-readable instructions 900 may be one or more executable programs or portion(s) of one or more executable programs for execution by programmable circuitry such as the programmable circuitry 1012 shown in the example processor platform 1000 discussed below in connection with FIG. 10 and may be one or more function(s) or portion(s) of functions to be performed by the example programmable circuitry discussed below in connection with FIG. 11 or 12. The instructions 900 begin at block 902 at which the filter 112 accesses a classified file corresponding to an access privilege of a user. For example, a user may log into the web app 120 using user credentials of the user. The web app 120 may use the user credentials (e.g., a user identifier) to provide an access privilege of the user to the filter 112. The access privilege of the user allows the filter 112 to access first classified chip information in a first classified file authorized for access by users assigned the access privilege provided by the web app 120. However, that same access privilege may prevent access to second classified chip information in a second classified file that cannot be accessed by users assigned the provided access privilege.

The filter 112 provides one or more chip names for display (block 904). In some example implementations of block 904, the filter 112 instructs a display of the client device 116 to show the one or more chip names in the device selection control 308a (FIG. 3) of the GUI 130 (FIGS. 1, 2, 3). For example, the filter 112 can provide to the web app 120 one or more semiconductor chip device names of semiconductor chip devices for which chip information is located in the classified file retrieved at block 902. In this manner, the web app 120 can display the one or more semiconductor chip device names in the device selection control 308a of the GUI 130. The filter 112 receives a user selection (block 906). For example, the user-provided selection may be a semiconductor chip device name selected by a user in the device selection control 308a. The filter 112 selects a filter level (block 908). For example, the filter 112 selects the first filter level 134a (FIGS. 1 and 2) to apply to the chip information corresponding to the semiconductor chip device name received at block 906. The filter 112 applies a corresponding filter to the classified chip information of the classified file (block 910). For example, the filter 112 applies the filter corresponding to the first filter level 134a to the classified file accessed at block 902 to identify IP core names in the classified chip information. The filter 112 provides subset chip information for display based on the filter (block 912). In some example implementations of block 912, the filter 112 instructs the display of the client device 116 to show IP core names as the subset chip information in the IP cores selection control 308b (FIG. 3) of the GUI 130. For example, the filter 112 provides IP core names as the subset chip information to the web app 120 based on the IP core names identified by the filtering of block 910. In this manner, the filter 112 causes the web app 120 to display the IP core names in the IP cores selection control 308b of FIG. 3.

The filter 112 determines whether the last filter level has been applied (block 914). For example, referring to FIGS. 1 and 2, the last filter level is the fourth filter level 134d. If the filter 112 determines that the last filter level has not yet been applied (block 914: NO), control returns to block 906. In this manner, blocks 906, 908, 910, 912, and 914 can be repeated multiple times based on subsequent user selections that cause the filter 112 to apply filters for different filter levels (e.g., the filters 134a-d) based on selections of, for example, chip regions and instances. During each iteration, the filter 112 provides filtered results (e.g., subsequent subset chip information) to the web app 120 for displaying in different ones of the chip region selection control 308c, the instance selection control 308d, and the register selection control 308e. For example, the filter 112 can apply an instance filter to the classified chip information of the classified file retrieved at block 902 so that the instance filter can identify circuit instances represented in the first classified chip information. The filter 112 can cause the web app 120 to display the circuit instance names via instance selection control 308d. The filter 112 can also apply a register filter to the first classified chip information to identify registers corresponding to a circuit instance selected by a user in the instance selection control 308d. The filter 112 can cause the web app 120 to display the register names corresponding to the identified registers.

If the filter level determines that the last filter level has been applied (block 914: YES), control advances to block 916. At block 916, the filter 112 provides register information for display. In some example implementations of block 916, the filter 112 instructs the display of the client device 116 to show register information in the register information view section 306 (FIG. 3) of the GUI 130. For example, the filter 112 can provide to the web app 120 register information for a user-selected one of the register names in the register selection control 308e. In this manner, the web app 120 can display the register information in the register information view section 306 of the GUI 130. The filter 112 determines whether it has received a parametric search request (block 918). For example, the filter 112 may receive a parametric search request and corresponding search text from the web app 120, when a user provides the search text in the parametric search field 304 (FIG. 3) of the GUI 130 and selects a search button control corresponding to the parametric search field 304. If the filter 112 determines that a parametric search request was not received (block 918: NO), the instructions 900 end. Otherwise, if the filter 112 determines that a parametric search request was received (block 918: YES), control advances to block 920, at which the filter 112 performs a parametric search based on the user-provided search text. For example, the filter performs the parametric search on the classified information of the classified file accessed at block 902 to generate search results. The filter 112 provides the search results for display (block 922). In some example implementations of block 912, the filter 112 instructs the display of the client device 116 to show the search results. For example, the filter 112 provides the search results generated at block 920 to the web app 120 so that the web app 120 can display the search results in one or more of the device selection control 308a, the IP cores selection control 308b, the chip regions selection control 308c, the instance selection control 308d, the register selection control 308e, or the register information view section 306 of the GUI 130. The example instructions 900 of FIG. 9 end.

Figure 10:
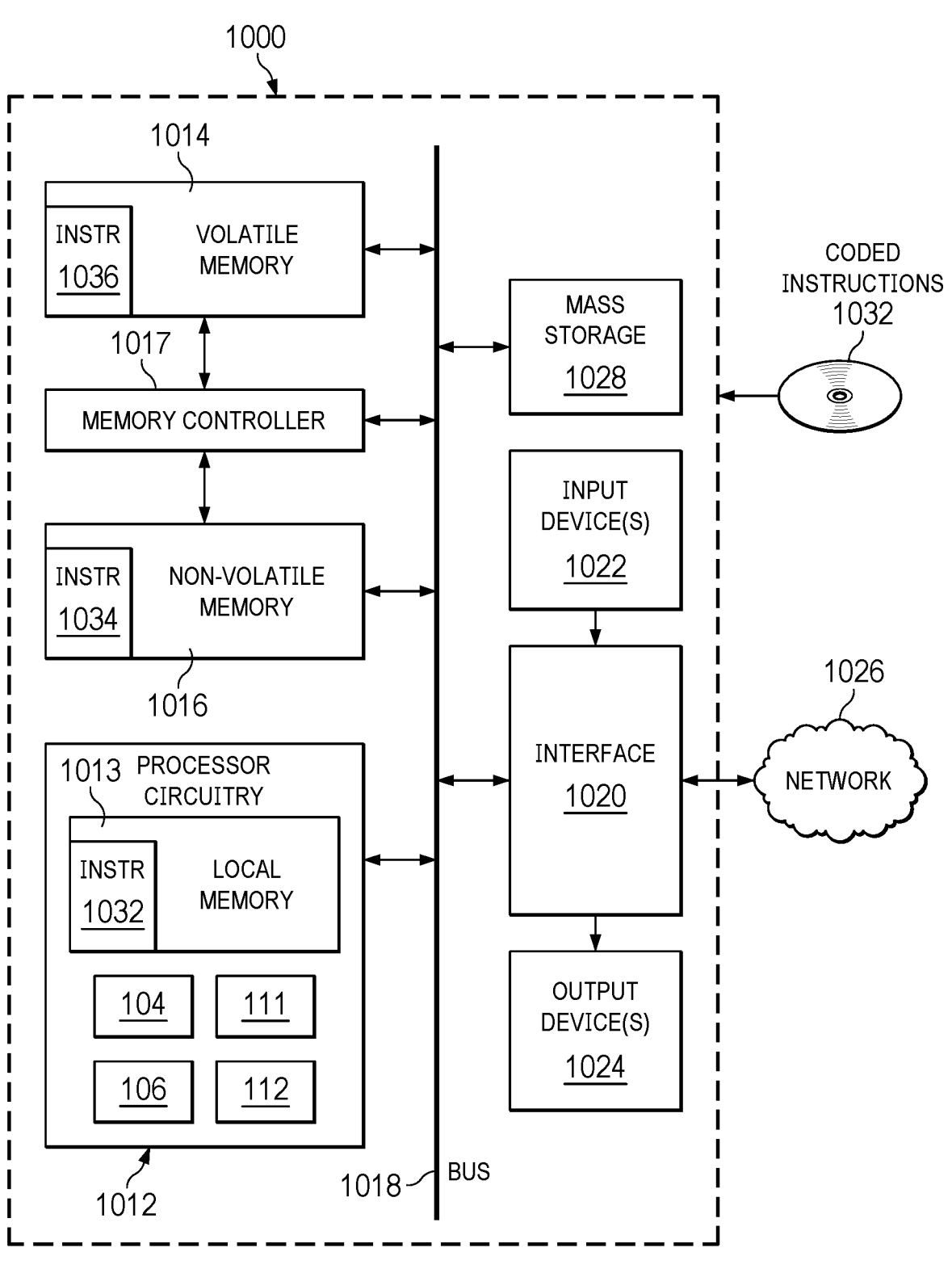
FIG. 10 is a block diagram of an example processing platform including programmable circuitry structured to execute, instantiate, and/or perform the example machine-readable instructions and/or perform the example operations of FIGS. 7-9 to implement the parser, the redactor, the filter, or the web app of one or more of FIGS. 1, 2, 4, and 6.

FIG. 10 is a block diagram of an example programmable circuitry platform 1000 structured to one or a combination of execute or instantiate one or more of the example machine-readable instructions or the example operations of FIGS. 7-9 to implement the augmentation storage interface 104, the parser 106, the redactor 111, and the filter 112 of FIGS. 1 and 2. The programmable circuitry platform 1000 can be, for example, a server, a personal computer, a workstation, a self-learning machine (e.g., a neural network), or any other type of computing or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAs, microprocessors, CPUs, GPUs, DSPs, or microcontrollers from any desired family or manufacturer. The programmable circuitry 1012 may be implemented by one or more semiconductor based (e.g., silicon based) devices. In this example, the programmable circuitry 1012 implements the augmentation storage interface 104, the parser 106, the redactor 111, and the filter 112.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by one or more Synchronous Dynamic Random Access Memory (SDRAM), Dynamic Random Access Memory (DRAM), RAMBUS® Dynamic Random Access Memory (RDRAM®), or any other type of RAM device. The non-volatile memory 1016 may be implemented by one or a combination of flash memory or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in according to any type of interface standard, such as an Ethernet interface, a universal serial bus (USB) interface, a Bluetooth® interface, a near field communication (NFC) interface, a Peripheral Component Interconnect (PCI) interface, or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter one of or a combination of data or commands into the programmable circuitry 1012. The input device(s) 1022 can be implemented by, for example, one of or a combination of an audio sensor, a microphone, a camera (still or video), a keyboard, a button, a mouse, a touchscreen, a trackpad, a trackball, an isopoint device, or a voice recognition system.

One or more output devices 1024 are also connected to the interface circuitry 1020 of the illustrated example. The output device(s) 1024 can be implemented, for example, by one of or a combination of display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, or speaker. The interface circuitry 1020 of the illustrated example, thus, includes one of or a combination of a graphics driver card, a graphics driver chip, or graphics processor circuitry such as a GPU.

The interface circuitry 1020 of the illustrated example also includes a communication device such as one of or a combination of a transmitter, a receiver, a transceiver, a modem, a residential gateway, a wireless access point, or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1000 of the illustrated example also includes one or more mass storage discs or devices 1028 to store one or more of firmware, software, or data. Examples of such mass storage discs or devices 1028 include one or more magnetic storage devices (e.g., floppy disk, drives, HDDs, etc.), optical storage devices (e.g., Blu-ray disks, CDs, DVDs, etc.), RAID systems, or solid-state storage discs or devices such as flash memory devices and SSDs.

The machine-readable instructions 1032, which may be implemented by the machine-readable instructions of FIGS. 7-9, may be stored in one of or a combination of the mass storage device 1028, in the volatile memory 1014, in the non-volatile memory 1016, or on at least one non-transitory computer readable storage medium such as a CD or DVD which may be removable.

Figure 11:
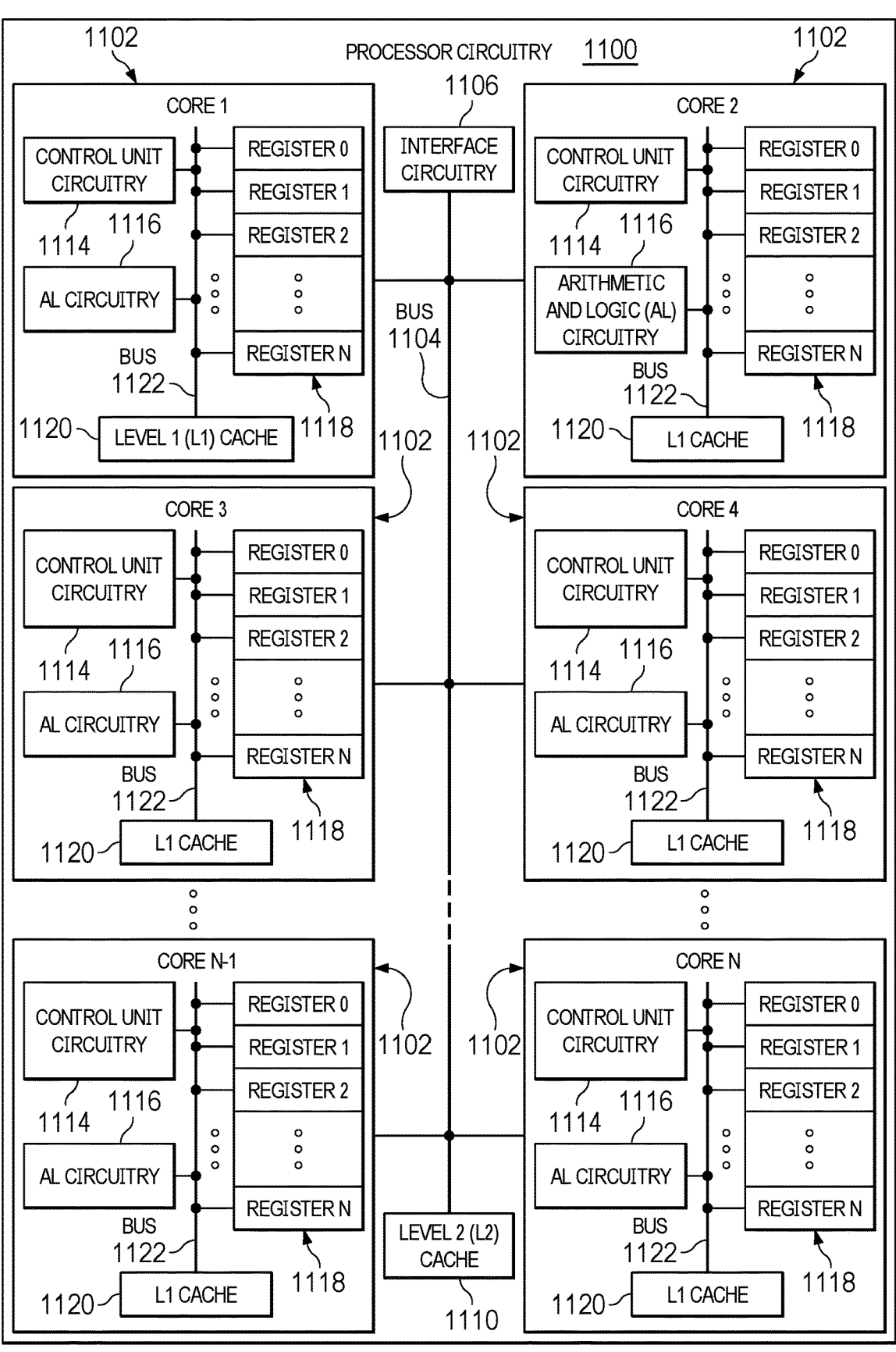
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose micropro-cessor (e.g., general-purpose microprocessor circuitry). The microprocessor 1100 executes some or all of the machine-readable instructions of the flowcharts of FIGS. 7-9 to effectively instantiate the circuitry of FIGS. 1 and 2 as logic circuits to perform operations corresponding to those machine-readable instructions. In some such examples, the circuitry of FIGS. 1 and 2 is instantiated by the hardware circuits of the microprocessor 1100 in combination with the machine-readable instructions. For example, the micropro-cessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate inde-pendently or may cooperate to execute machine-readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded soft-ware program, or the software program is split into threads and executed in parallel by two or more of the cores 1102. The software program may correspond to a portion or all of the machine-readable instructions or operations represented by the flowcharts of FIGS. 7-9.

The cores 1102 may communicate by a first example bus 1104. In some examples, the first bus 1104 may be imple-mented by a communication bus to effectuate communica-tion associated with one(s) of the cores 1102. For example, the first bus 1104 may be implemented by at least one of an Inter-Integrated Circuit (I2C) bus, a Serial Peripheral Inter-face (SPI) bus, a PCI bus, or a PCIe bus. Also or alterna-tively, the first bus 1104 may be implemented by any other type of computing or electrical bus. The cores 1102 may obtain data, instructions, and signals from one or more external devices by example interface circuitry 1106. The cores 1102 may output data, instructions, and signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and instructions. Data and instructions may be transferred (e.g., shared) by one of or a combination of writing to or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit cir-cuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic or logic operations on the data within the corresponding core 1102. The AL circuitry 1116 of some examples performs integer based operations. In other examples, the AL circuitry 1116 also performs float-ing-point operations. In yet other examples, the AL circuitry 1116 may include first AL circuitry that performs integer-based operations and second AL circuitry that performs floating-point operations. In some examples, the AL cir-cuitry 1116 may be referred to as an Arithmetic Logic Unit (ALU).

The registers 1118 are semiconductor-based structures to store data and instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alterna-tively, the registers 1118 may be organized in any other arrangement, format, or structure, such as by being distrib-uted throughout the core 1102 to shorten access time. The second bus 1122 may be implemented by at least one of an I2C bus, a SPI bus, a PCI bus, or a PCIe bus.

Each core 1102 or, more generally, the microprocessor 1100 may include additional or alternate structures to those shown and described above. For example, one or more clock circuits, one or more power supplies, one or more power gates, one or more cache home agents (CHAs), one or more converged/common mesh stops (CMSs), one or more shift-ers (e.g., barrel shifter(s)) or other circuitry may be present. The microprocessor 1100 is a semiconductor device fabri-cated to include many transistors interconnected to imple-ment the structures described above in one or more inte-grated circuits (ICs) contained in one or more packages.

The microprocessor 1100 may include or cooperate with one or more accelerators (e.g., acceleration circuitry, hard-ware accelerators, etc.). In some examples, accelerators are implemented by logic circuitry to perform certain tasks more quickly and efficiently than can be done by a general-purpose processor. Examples of accelerators include ASICs and FPGAs such as those discussed herein. A GPU, DSP, or other programmable device can also be an accelerator. Accelerators may be on-board the microprocessor 1100, in the same chip package as the microprocessor 1100, or in one or more separate packages from the microprocessor 1100.

FIG. 12 is a block diagram of another example imple-mentation of the programmable circuitry 1012 of FIG. 10. In this example, the programmable circuitry 1012 is imple-mented by FPGA circuitry 1200. For example, the FPGA circuitry 1200 may be implemented by an FPGA. The FPGA circuitry 1200 can be used, for example, to perform opera-tions that could otherwise be performed by the example microprocessor 1100 of FIG. 11 executing corresponding machine-readable instructions. However, once configured, the FPGA circuitry 1200 instantiates the operations and functions corresponding to the machine-readable instruc-tions in hardware and, thus, can often execute the opera-tions/functions faster than they could be performed by a general-purpose microprocessor executing the correspond-ing software.

More specifically, in contrast to the microprocessor 1100 of FIG. 11 described above (which is a general purpose device that may be programmed to execute some or all of the machine-readable instructions represented by the flowchart(s) of FIGS. 7-9 but whose interconnections and logic circuitry are fixed once fabricated), the FPGA circuitry 1200 of the example of FIG. 12 includes interconnections and logic circuitry that may be one of or a combination of configured, structured, programmed, and interconnected in different ways after fabrication to instantiate, for example, some or all of the operations/functions corresponding to the machine-readable instructions represented by the flowchart(s) of FIGS. 7-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7-9. As such, the FPGA circuitry 1200 may be at least one of configured or structured to effectively instantiate some or all of the operations/functions corresponding to the machine-readable instructions of the flowchart(s) of FIGS. 7-9 as dedicated logic circuits to perform the operations/functions corresponding to those software instructions in a dedicated manner analogous to an ASIC. Therefore, the FPGA circuitry 1200 may perform the operations/functions corresponding to the some or all of the machine-readable instructions of FIGS. 7-9 faster than the general-purpose microprocessor can execute the same.

In the example of FIG. 12, the FPGA circuitry 1200 is at least one of configured or structured in response to being programmed (and/or reprogrammed one or more times) based on a binary file. In some examples, the binary file may be one of or both of compiled or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may at least one of access or load the binary file to cause the FPGA circuitry 1200 of FIG. 12 to be at least one of configured or structured to perform the one or more operations/functions. For example, the binary file may be implemented by one of or a combination of a bit stream (e.g., one or more computer-readable bits, one or more machine-readable bits, etc.), data (e.g., computer-readable data, machine-readable data, etc.), or machine-readable instructions accessible to the FPGA circuitry 1200 of FIG. 12 to at least one of configure or structure the FPGA circuitry 1200 of FIG. 12, or portion(s) thereof.

In some examples, the binary file is at least one of compiled, generated, transformed, or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is at least one of compiled, generated, or otherwise output from the uniform software platform based on the second instructions. In some examples, the FPGA circuitry 1200 of FIG. 12 may at least one of access or load the binary file to cause the FPGA circuitry 1200 of FIG. 12 to be at least one of configured or structured to perform the one or more operations/functions. For example, the binary file may be implemented by one of or a combination of a bit stream (e.g., one or more computer-readable bits, one or more machine-readable bits, etc.), data (e.g., computer-readable data, machine-readable data, etc.), or machine-readable instructions accessible to the FPGA circuitry 1200 of FIG. 12 to at least one of configure or structure the FPGA circuitry 1200 of FIG. 12, or portion(s) thereof.

The FPGA circuitry 1200 of FIG. 12, includes example input/output (I/O) circuitry 1202 to at least one of obtain or output data to/from at least one of example configuration circuitry 1204 or external hardware 1206. For example, the configuration circuitry 1204 may be implemented by interface circuitry that may obtain a binary file, which may be implemented by one or more of a bit stream, data, or machine-readable instructions, to configure the FPGA circuitry 1200, or portion(s) thereof. In some such examples, the configuration circuitry 1204 may obtain the binary file from one of or a combination of a user, a machine (e.g., hardware circuitry (e.g., programmable or dedicated circuitry) that may implement an Artificial Intelligence/Machine Learning (AI/ML) model to generate the binary file, etc.), or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine-readable instructions of FIGS. 7-9 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of one of or a combination of the electrical structures or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 or an example DSP 1222. Other general purpose programmable circuitry 1218 may also or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may also be implemented by combining at least the example microprocessor 1100 of FIG. 11 and the example FPGA circuitry 1200 of FIG. 12. In some such hybrid examples, one or more cores 1102 of FIG. 11 may execute a first portion of the machine-readable instructions represented by the flowchart(s) of FIGS. 7-9 to perform first operation(s)/function(s), the FPGA circuitry 1200 of FIG. 12 may be at least one of configured or structured to perform second operation(s)/function(s) corresponding to a second portion of the machine-readable instructions represented by the flowcharts of FIGS. 7-9, and/or an ASIC may be at least one of configured or structured to perform third operation(s)/function(s) corresponding to a third portion of the machine-readable instructions represented by the flowcharts of FIGS. 7-9.

Some or all of the circuitry of FIGS. 1 and 2 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be at least one of configured or structured to perform operations/functions corresponding to portion(s) of machine-readable instructions at the same and/or different times.

In some examples, some or all of the circuitry of FIGS. 1 and 2 may be instantiated, for example, in one or more threads executing concurrently and/or in series. For example, the microprocessor 1100 of FIG. 11 may execute machine-readable instructions in one or more threads executing concurrently and/or in series. In some examples, the FPGA circuitry 1200 of FIG. 12 may be at least one of configured or structured to carry out operations/functions concurrently and/or in series. Moreover, in some examples, some or all of the circuitry of FIGS. 1 and 2 may be implemented within one or more virtual machines or containers executing on the microprocessor 1100 of FIG. 11.

In some examples, the programmable circuitry 1012 of FIG. 10 may be in one or more packages. For example, at least one of the microprocessor 1100 of FIG. 11 or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
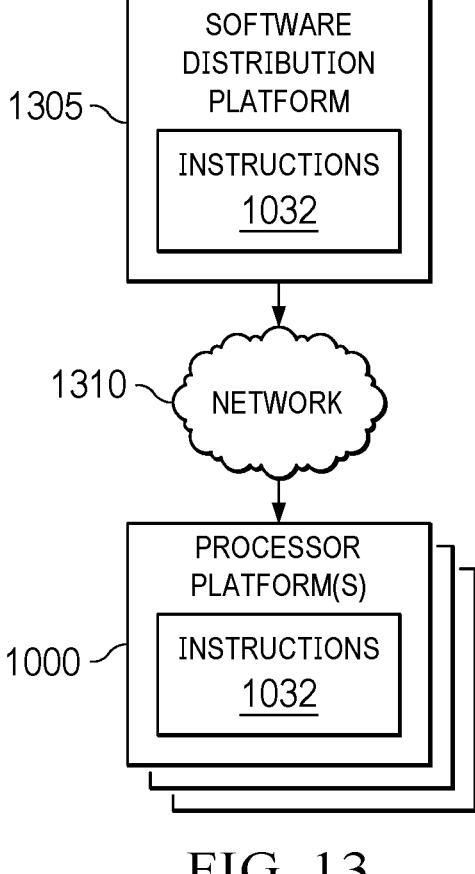
FIG. 13 is a block diagram of an example software/firmware/instructions distribution platform (e.g., one or more servers) to distribute software, instructions, and/or firmware (e.g., corresponding to the example machine-readable instructions of FIGS. 7-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine-readable instructions 1032 of FIG. 10 to other hardware devices (e.g., one or more hardware devices owned or operated by third parties from the owner or operator of the software distribution platform) is illustrated in FIG. 13. The example software distribution platform 1305 may be implemented by any computer server, data facility, cloud service, etc., capable of storing and transmitting software to other computing devices. The third parties may be customers of the entity at least one of owning or operating the software distribution platform 1305. For example, the entity that at least one of owns or operates the software distribution platform 1305 may be at least one of a developer, a seller, or a licensor of software such as the example machine-readable instructions 1032 of FIG. 10. The third parties may be consumers, users, retailers, OEMs, etc., who one of or a combination of purchase or license the software for at least one of use, re-sale, or sub-licensing. In the illustrated example, the software distribution platform 1305 includes one or more servers and one or more storage devices. The storage devices store the machine-readable instructions 1032, which may correspond to the example machine-readable instructions of FIGS. 7-9, as described above. The one or more servers of the example software distribution platform 1305 are in communication with an example network 1310, which may correspond to any one or more of the Internet or any of the example networks described above. In some examples, the one or more servers are responsive to requests to transmit the software to a requesting party as part of a commercial transaction. Payment for at least one of the delivery, sale, or license of the software may be handled by the one or more servers of at least one of the software distribution platform or by a third party payment entity. The servers enable one or more purchasers or licensors to download the machine-readable instructions 1032 from the software distribution platform 1305. For example, the software, which may correspond to the example machine-readable instructions of FIG. 7-9, may be downloaded to the example programmable circuitry platform 1000, which is to execute the machine-readable instructions 1032 to implement the augmentation storage interface 104, the parser 106, the redactor 111, and the filter 112. In some examples, one or more servers of the software distribution platform 1305 periodically at least one of offer, transmit, or force updates to the software (e.g., the example machine-readable instructions 1032 of FIG. 10) to ensure improvements, patches, updates, etc., are distributed and applied to the software at the end user devices. Although referred to as software above, the distributed "software" could alternatively be firmware.

While an example manner of implementing the augmentation storage interface 104, the parser 106, the redactor 111, the filter 112, and the web app 120 are illustrated in FIGS. 1, 2, and 4, one or more of the elements, processes, or devices illustrated in FIGS. 1, 2, and 4 may be combined, divided, re-arranged, omitted, eliminated, or implemented in any other way. Further, the augmentation storage interface

104, the parser 106, the redactor 111, the filter 112, or the web app 120 of FIGS. 1, 2, and 4, may be implemented by hardware alone or by hardware in combination with software and firmware. Thus, for example, any of the augmentation storage interface 104, the parser 106, the redactor 111, the filter 112, or the web app 120, could be implemented by programmable circuitry in combination with one or more machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), or field programmable logic device(s) (FPLD(s)) such as FPGAs. Further still, the augmentation storage interface 104, the parser 106, the redactor 111, the filter 112, or the web app 120 of FIGS. 1, 2, and 4 may include one or more elements, processes, or devices in addition to, or instead of, those illustrated in FIGS. 1, 2, and 4, or may include more than one of any or all of the illustrated elements, processes and devices.

Flowchart(s) representative of example machine-readable instructions, which may be executed by programmable circuitry to at least one of implement or instantiate the augmentation storage interface 104, the parser 106, the redactor 111, the filter 112, and the web app 120 of FIGS. 1, 2, and 4 or representative of example operations which may be performed by programmable circuitry to at least one of implement or instantiate the augmentation storage interface 104, the parser 106, the redactor 111, the filter 112, and the web app 120 of FIGS. 1, 2, and 4, are shown in FIGS. 7-9. The machine-readable instructions may be one or more executable programs or portion(s) of one or more executable programs for execution by programmable circuitry such as the programmable circuitry 1012 shown in the example processor platform 1000 discussed below in connection with FIG. 10 and may be one or more function(s) or portion(s) of functions to be performed by the example programmable circuitry (e.g., an FPGA) discussed below in connection with FIG. 11 or 12. In some examples, the machine-readable instructions cause an operation, a task, etc., to be carried out or performed in an automated manner in the real-world. As used herein, "automated" means without human involvement.

The program may be embodied in instructions (e.g., software and/or firmware) stored on one or more non-transitory computer readable and/or machine-readable storage medium such as one of or a combination of cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), or any other storage device or storage disk. The instructions of the non-transitory computer readable and/or machine-readable medium may program or be executed by programmable circuitry located in one or more hardware devices, but the entire program or parts thereof could alternatively be executed or instantiated by one or more hardware devices other than the programmable circuitry or embodied in dedicated hardware. The machine-readable instructions may be distributed across multiple hardware devices or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7-9, many other methods of implementing the augmentation storage interface 104, the parser 106, the redactor 111, and the filter 112 may alternatively be used. For example, the order of execution of the blocks of the flowchart(s) may be changed, or some of the blocks described may be changed, eliminated, or combined. Also or alternatively, any or all of the blocks of the flow chart may be implemented by one or more hardware circuits (e.g., processor circuitry, discrete, integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations or local to one or more hardware devices (e.g., a single-core processor (e.g., a single core CPU), a multi-core processor (e.g., a multi-core CPU, an XPU, etc.)). For example, the programmable circuitry may be one of or a combination of a CPU or an FPGA located in the same package (e.g., the same integrated circuit (IC) package or in two or more separate housings), one or more processors in a single machine, multiple processors distributed across multiple servers of a server rack, multiple processors distributed across one or more server racks, etc., or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, or produce machine executable instructions. For example, the machine-readable instructions may be fragmented and stored on one or more storage devices, disks or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, or executable by a computing device or other machine. For example, the machine-readable instructions may be stored in multiple parts, which are individually compressed, encrypted, or stored on separate computing devices, wherein the parts when decrypted, decompressed, or combined form a set of one or more computer-executable or machine executable instructions that implement one or more functions or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions or the corresponding program(s) can be executed in whole or in part. Thus, machine-readable, computer readable or machine-readable media, as used herein, may include one or a combination of instructions and program(s) regardless of the particular format or state of the machine-readable instructions or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer readable and/or machine-readable instructions) stored on one or more non-transitory computer readable or machine-readable media. As used herein, the terms non-transitory computer readable medium, non-transitory computer readable storage medium, non-transitory machine-readable medium, and non-transitory machine-readable storage medium are expressly defined to include any type of computer readable storage device or storage disk and to exclude propagating signals and to exclude transmission media. Examples of such non-transitory computer readable medium, non-transitory computer readable storage medium, non-transitory machine-readable medium, or non-transitory machine-readable storage medium include one or more optical storage devices, magnetic storage devices, an HDD, a flash memory, a read-only memory (ROM), a CD, a DVD, a cache, a RAM of any type, a register, or any other storage device or storage disk in which information is stored for any duration (e.g., for extended time periods, permanently, for brief instances, for temporarily buffering, for caching of the information). As used herein, the terms "non-transitory computer readable storage device" and "non-transitory machine-readable storage device" are defined to include any physical (mechanical, magnetic, electromechanical, or electrical) hardware to retain information for a time period, but to exclude propagating signals and to exclude transmission media. Examples of non-transitory computer readable storage devices or non-transitory machine-readable storage devices include one or a combination of random-access memory of any type, read only memory of any type, solid state memory, flash memory, optical discs, magnetic disks, disk drives, or redundant array of independent disks (RAID) systems. As used herein, the term "device" refers to physical structure such as one of or a combination of mechanical, electromechanical, or electrical equipment, hardware, or circuitry that may or may not be configured by computer readable instructions, machine-readable instructions, etc., or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and things, the phrase "at least one of A and B" refers to implementations including any of (1) at least one A, (2) at least one B, or (3) at least one A and at least one B. Similarly, as used herein in the context of describing structures, components, items, objects and things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is at least one of not feasible or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by at least one of the connection reference or relative movement between those elements unless otherwise indicated. As such, connection references do not necessarily infer that two elements are directly connected or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, or ordering in any way, but are merely used as at least one of labels or arbitrary names to distinguish elements for ease of understanding the described examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, the phrase "in communication," including variations thereof, encompasses one of or a combination of direct communication or indirect communication through one or more intermediary components, and does not require direct physical (e.g., wired) communication or constant communication, but rather also includes selective communication at least one of periodic intervals, scheduled intervals, aperiodic intervals, or one-time events.

As used herein, "programmable circuitry" is defined to include at least one of (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform one or more specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to at least one of configure or structure the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., at least one of programmed or hardwired) at a time of manufacturing by a manufacturer to at least one of perform the function or be configurable (or re-configurable) by a user after manufacturing to perform the function/or other additional or alternative functions. The configuring may be through at least one of firmware or software programming of the device, through at least one of a construction or layout of hardware components and interconnections of the device, or a combination thereof.

In the description and claims, described "circuitry" may include one or more circuits. A circuit or device that is described herein as including certain components may instead be adapted to be coupled to those components to form the described circuitry or device. For example, a structure described as including one or more semiconductor elements (such as transistors), one or more passive elements (such as one of or a combination of resistors, capacitors, or inductors), or one or more sources (such as voltage and/or current sources) may instead include only the semiconductor elements within a single physical device (e.g., at least one of a semiconductor die or integrated circuit (IC) package) and may be adapted to be coupled to at least some of the passive elements or the sources to form the described structure either at a time of manufacture or after a time of manufacture, for example, by at least one of an end-user or a third-party.

Circuits described herein are reconfigurable to include the replaced components to provide functionality at least partially similar to functionality available prior to the component replacement. Components shown as resistors, unless otherwise stated, are generally representative of any one or more elements coupled in at least one of series or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and some features illustrated as being internal to the integrated circuit may be incorporated outside of the integrated. As used herein, the term "integrated circuit" means one or more circuits that are at least one of: (i) incorporated in/over a semiconductor substrate; (ii) incorporated in a single semiconductor package; (iii) incorporated into the same module; or (iv) incorporated in/on the same printed circuit board.

Modifications are possible in the described embodiments, and other embodiments are possible, within the scope of the claims.

From the foregoing, it will be appreciated that example systems, apparatus, articles of manufacture, and methods have been described that provide register information for semiconductor chips. Described systems, apparatus, articles of manufacture, and methods improve the efficiency of using a computing device by providing an application program having a user interface for users to perform parametric searches or filtering of the chip information using a more automated approach than manually searching through a multi-page TRM document. In addition, examples described herein retrieve chip information for user access within milliseconds delivery time, even when the information is accessed from a server. Described systems, apparatus, articles of manufacture, and methods are also directed to one or more improvement(s) in the operation of a machine such as a computer or other electronic, electromechanical, or mechanical device.

What is claimed is:

1. A method comprising:
accessing, by storage interface circuitry, chip information, the chip information corresponding to a semiconductor chip;
removing, by at least one processor circuit, redundant information from the chip information to generate deduplicated chip information;
classifying, by the at least one processor circuit, the deduplicated chip information into first classified chip information and second classified chip information, the first classified chip information corresponding to a first access permission, the second classified chip information corresponding to a second access permission, the first classified chip information including information about a first number of registers in the semiconductor chip, the second classified chip information including information about a second number of registers in the semiconductor chip, the second classified chip information indicative of access to information about a subset of the first number of registers, the second number of registers being the subset of the first number of registers; and
causing, by the at least one processor circuit, storing of the first classified chip information in a first classified file in memory and the second classified chip information in a second classified file in the memory.

2. The method of claim 1, wherein the chip information includes register information corresponding to a plurality of registers of the semiconductor chip.

3. The method of claim 1, further comprising:
accessing the first classified chip information in the first classified file based on an access permission associated with a user identifier; and
preventing access to the second classified chip information in the second classified file based on the user identifier.

4. The method of claim 1, further comprising:
applying a first level filter and a second level filter to the first classified chip information.

5. The method of claim 4, further comprising filtering intellectual property (IP) cores of the semiconductor chip in the first classified chip information based on the first level filter.

6. The method of claim 5, further comprising filtering regions of the semiconductor chip in the first classified chip information based on the second level filter.

7. The method of claim 6, further comprising:
applying an instance filter to the first classified chip information, the instance filter to identify a plurality of circuit instances represented in the first classified chip information;
applying a register filter to the first classified chip information, the register filter to identify registers corresponding to a first circuit instance of the circuit instances; and causing a user interface to display the plurality of circuit instances and to display the registers corresponding to the first circuit instance.

8. The method of claim 1, wherein the accessing of the chip information includes accessing the chip information in a JavaScript Object Notation (JSON) file.

9. The method of claim 1, further comprising preventing access to information of a portion of the first number of registers by providing access to the second classified file.

10. An apparatus comprising:
memory;
machine-readable instructions in the memory; and
at least one processor circuit to be programmed by the machine-readable instructions to:
select a file from one of a first or second classified file based on a user, the first classified file including information about a first number of registers, the second classified file including information about a second number of registers, the second file indicative of access to information about a subset of the first number of registers, the second number of registers being the subset of the first number of registers;
apply a first filter to information in the file based on a first user selection of one of first names in a first graphical user interface (GUI) selection control of a GUI;
apply a second filter to the information in the file based on a second user selection of one of second names in a second GUI selection control of the GUI; and
provide register information to display in an information view section of the GUI based on a third user selection of one of third names in a third GUI selection control of the GUI.

11. The apparatus of claim 10, wherein one or more of the at least one processor circuit is to:
access first classified chip information in the file based on an access permission associated with a user identifier; and
prevent access to second classified chip information in a second file based on the user identifier.

12. The apparatus of claim 10, wherein the first names are semiconductor chip device names, the second names are intellectual property core names, the third names are register names, and the information view section is a register information view section to display descriptions of registers of semiconductor chip devices.

13. The apparatus of claim 10, wherein the at least one processor circuit is in a client device, the machine-readable instructions to cause one or more of the at least one processor circuit to apply the first and second filters in the client device.

14. The apparatus of claim 10, wherein the at least one processor circuit is in a server, the machine-readable instructions to cause one or more of the at least one processor circuit to:
apply the first and second filters in the server; and
provide the first, second, and third names to a client device via a network.

15. An apparatus comprising:
memory;
machine-readable instructions in the memory;
a display; and
at least one processor circuit coupled to the memory and to the display, the at least one processor circuit to be programmed by the machine-readable instructions to:
obtain one of a first or second file based on a user, the first file including information about a first number of registers, the second file including information about a second number of registers, the second second file indicative of access to information about a subset of the first number of registers, the second number of registers being the subset of the first number of registers;

instruct the display to show first names in a first graphical user interface (GUI) selection control of a GUI;

based on a first user selection of one of the first names, apply a first filter to information in the obtained file;

based on the first filter, instruct the display to show second names in a second GUI selection control of the GUI;

based on a second user selection of one of the second names, apply a second filter to the information in the file;

based on the second filter, instruct the display to show third names in a third GUI selection control of the GUI; and based on a third user selection of one of the third names, instruct the display to show register information in an information view section of the GUI.

16. The apparatus of claim 15, wherein the first names are semiconductor chip device names, the second names are intellectual property core names, the third names are register names, and the information view section is a register information view section to present descriptions of registers of semiconductor chip devices.

17. The apparatus of claim 15, wherein the first filter corresponds to a first hierarchy level of a filter hierarchy tree, the second filter corresponding to a second hierarchy level of the filter hierarchy tree.

18. The apparatus of claim 15, wherein one or more of the at least one processor circuit is to:

instruct the display to show the first, second, and third GUI selection controls in a filter section of the GUI; and instruct the display to show a parametric search field in the GUI.

19. The apparatus of claim 15, wherein one or more of the at least one processor circuit is to:

receive a parametric search request from the GUI;

perform a parametric search on the information in the file based on user-provided search text, the user-provided search text from a parametric search field in the GUI; and instruct the display to show a result of the parametric search in the information view section of the GUI.

20. The apparatus of claim 15, wherein the at least one processor circuit is in a client device, one or more of the at least one processor circuit to apply the first and second filters in the client device.

21. The apparatus of claim 15, wherein the at least one processor circuit is in a server, one or more of the at least one processor circuit to:

apply the first and second filters in the server; and provide the first, second, and third names to a client device via a network.

* * * * *